(12) United States Patent
Korcz et al.

(10) Patent No.: US 11,581,718 B2
(45) Date of Patent: Feb. 14, 2023

(54) ELECTRICAL BOX SUPPORT

(71) Applicant: Hubbell Incorporated, Shelton, CT (US)

(72) Inventors: Krzysztof Wojciech Korcz, Granger, IN (US); Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 5 days.

(21) Appl. No.: 17/228,288

(22) Filed: Apr. 12, 2021

(65) Prior Publication Data

US 2021/0320485 A1 Oct. 14, 2021

Related U.S. Application Data

(60) Provisional application No. 63/009,069, filed on Apr. 13, 2020.

(51) Int. Cl.
*H02G 3/12* (2006.01)
*H02G 3/36* (2006.01)

(52) U.S. Cl.
CPC .................. *H02G 3/121* (2013.01)

(58) Field of Classification Search
CPC .......... H02G 3/36; H02G 3/123; H02G 3/126; H02G 3/125; H02G 3/121; H02G 3/12; H05K 5/0204
See application file for complete search history.

(56) References Cited

U.S. PATENT DOCUMENTS

| 1,774,934 | A | * | 9/1930 | Mangin | H02G 3/125 220/3.9 |
|---|---|---|---|---|---|
| 5,288,041 | A | | 2/1994 | Webb | |
| 5,646,371 | A | | 7/1997 | Fabian | |
| 8,403,277 | B2 | * | 3/2013 | Nuernberger | H02G 3/08 248/200.1 |
| 9,337,635 | B2 | | 5/2016 | Korcz et al. | |
| 9,887,524 | B1 | | 2/2018 | Gretz | |
| 2007/0084617 | A1 | | 4/2007 | Dinh | |
| 2008/0029287 | A1 | * | 2/2008 | Korcz | H02G 3/126 174/58 |
| 2014/0318824 | A1 | | 10/2014 | Johnson et al. | |
| 2015/0318677 | A1 | * | 11/2015 | Witherbee | H02G 3/10 248/218.4 |
| 2017/0077689 | A1 | * | 3/2017 | Korcz | H02G 3/123 |
| 2020/0266617 | A1 | * | 8/2020 | Semple | H02G 3/081 |

OTHER PUBLICATIONS

International Search Report dated Jul. 15, 2021 in corresponding PCT International Patent Application No. PCT/US2021/026876, 2 pgs.
Written Opinion dated Jul. 15, 2021 in corresponding PCT International Patent Application No. PCT/US2021/026876, 6 pgs.

* cited by examiner

*Primary Examiner* — Hoa C Nguyen
*Assistant Examiner* — Amol H Patel
(74) *Attorney, Agent, or Firm* — Ruggiero, McAllister & McMahon LLC

(57) ABSTRACT

Electrical box assemblies are provided that have a support that is adjustable to different sizes. The electrical box assemblies provided also include a cable support that moves from a shipping position to an installed position.

19 Claims, 33 Drawing Sheets

ELECTRICAL BOX SUPPORT

CROSS REFERENCE TO RELATED APPLICATIONS

This application claims the benefit of U.S. Provisional Application 63/009,069 filed Apr. 13, 2020, the contents of which are incorporated by reference herein.

BACKGROUND

1. Field of the Invention

The present disclosure is related to electrical boxes. More particularly, the present disclosure is related to an electrical box assembly having a support that is adjustable to different sizes. The present disclosure is also related to an electrical box assembly having a cable support that moves from a shipping position to an installed position.

2. Description of Related Art

Electrical boxes that enclose and support electrical devices, cables, and wiring are known. Electrical boxes can be secured to a structure such as a ceiling or wall. One way to connect an electrical box to a wall is to connect the electrical box to a framing stud so that the electrical box will extend between a front drywall panel and a rear drywall panel of the wall.

However, electrical boxes secured to framing studs, especially metal studs, need added support to prevent movement. A common method of providing stability is to support the box from the drywall on the opposite side of the wall from where the box is mounted, namely, the rear drywall panel. The problem with this method is the number of stud sizes used in construction. Studs are manufactured in 2.5 inch, 3.5 inch, 3.625 inch, 4 inch, 5.5 inch and 6 inch depths.

A common practice to accommodate the variety of stud sizes is to mount the electrical box to a bracket that attaches to the stud and provides selectable support to match stud depths that will rest against the rear drywall panel. However, this requires the availability of multiple sized supports during installation or knowing the exact measurement beforehand.

Some electrical boxes also include a cable support bracket. This cable support bracket must either be connected to the electrical box during manufacture or undesirably connected during installation. Typically the cable support bracket extends outward from a forward opening in the electrical box in a cantilevered configuration when connected during manufacture. However, this configuration can be damaged prior to installation, for example, during shipping.

Accordingly, it has been determined by the present disclosure that there is a continuing need for electrical boxes and supports that overcome, alleviate, and/or mitigate one or more of the aforementioned and other deleterious effects of prior art conduits.

SUMMARY

Electrical box assemblies are provided that have a support that is adjustable to different sizes. The electrical box assemblies provided also include a cable support that moves from a shipping position to an installed position.

An electrical box assembly is provided that includes a box body and a support connected to the box body. The support has a plurality of appendages. The plurality of appendages are adjustable to a plurality of configurations to adjust a size of the support.

In some embodiments either alone or together with any one or more of the aforementioned and/or after-mentioned embodiments, the support has a support body, and the plurality of appendages extend outward from the support body.

In some embodiments either alone or together with any one or more of the aforementioned and/or after-mentioned embodiments, the support body has a U-shaped opening forming a flap that is bendable outward from the support body.

In some embodiments either alone or together with any one or more of the aforementioned and/or after-mentioned embodiments, the plurality of appendages are bendable to adjust their size.

In some embodiments either alone or together with any one or more of the aforementioned and/or after-mentioned embodiments, the support is movable from a shipping configuration where a support body of the support is adjacent the box body to an installed position where the support body moves away from the box body.

In some embodiments either alone or together with any one or more of the aforementioned and/or after-mentioned embodiments, the support body has a first side projection on a first side of a support body extending outward from the support body in a first direction, and the support has a second side projection that extends from the support body that is bendable from a shipping configuration to an installed configuration so that the second side projection extends outward from the support body in a second direction that is opposite the first direction to maintain the support in the installed position.

In some embodiments either alone or together with any one or more of the aforementioned and/or after-mentioned embodiments, a support extension that is connectable to the support is included, and the support extension is connectable to different positions along the support to adjust the size of the support.

In some embodiments either alone or together with any one or more of the aforementioned and/or after-mentioned embodiments, the support has a plurality of openings through a support body, and the support extension connects to different openings of the plurality of openings to adjust the size of the support.

In some embodiments either alone or together with any one or more of the aforementioned and/or after-mentioned embodiments, the support extension has a tab that folds over the support to clamp onto the support.

In some embodiments either alone or together with any one or more of the aforementioned and/or after-mentioned embodiments, the support extension has a plurality of tabs, and each of the plurality of tabs folds over the support to clamp onto the support in a different position than another of the plurality of tabs.

In some embodiments either alone or together with any one or more of the aforementioned and/or after-mentioned embodiments, the support is 0.062 galvanized steel.

In some embodiments either alone or together with any one or more of the aforementioned and/or after-mentioned embodiments, the support can be in the shipped position when connected to a stud.

An electrical box assembly is also provided that includes a box body and a cable support bracket connected to the box body. The cable support bracket is movable from a shipping position to an installed position.

In some embodiments either alone or together with any one or more of the aforementioned and/or after-mentioned embodiments, the box body has a rear wall opposite to an opening, and the support bracket is connected to the rear wall.

In some embodiments either alone or together with any one or more of the aforementioned and/or after-mentioned embodiments, the cable support bracket has a connection portion connected to the box body and a support portion that extends away from the connection portion.

In some embodiments either alone or together with any one or more of the aforementioned and/or after-mentioned embodiments, the support portion is adjacent the rear wall in the shipped position.

In some embodiments either alone or together with any one or more of the aforementioned and/or after-mentioned embodiments, the support portion is folded over the connection portion in the installed position.

In some embodiments either alone or together with any one or more of the aforementioned and/or after-mentioned embodiments, the support portion is extended away from the rear wall in the installed position.

An electrical box assembly is further provided that includes a box body, a support base that is connected to the box body, and a support base extension that is connectable to the support base in a plurality of positions so that an assembly of the support base extension that is connected to the support base has a different size in each of the plurality of positions.

An electrical box assembly is additionally provided that includes a box body, a support member and a fastener. The support member is selectively connected to the box body. The support member has at least one opening between two ends. The fastener is selectively connectable to the support member through the at least one opening to connect the support member on the box body so that the support member is bendable on at least one side of the fastener.

The above-described and other features and advantages of the present disclosure will be appreciated and understood by those skilled in the art from the following detailed description, drawings, and appended claims.

DETAILED DESCRIPTION

Figure 1:
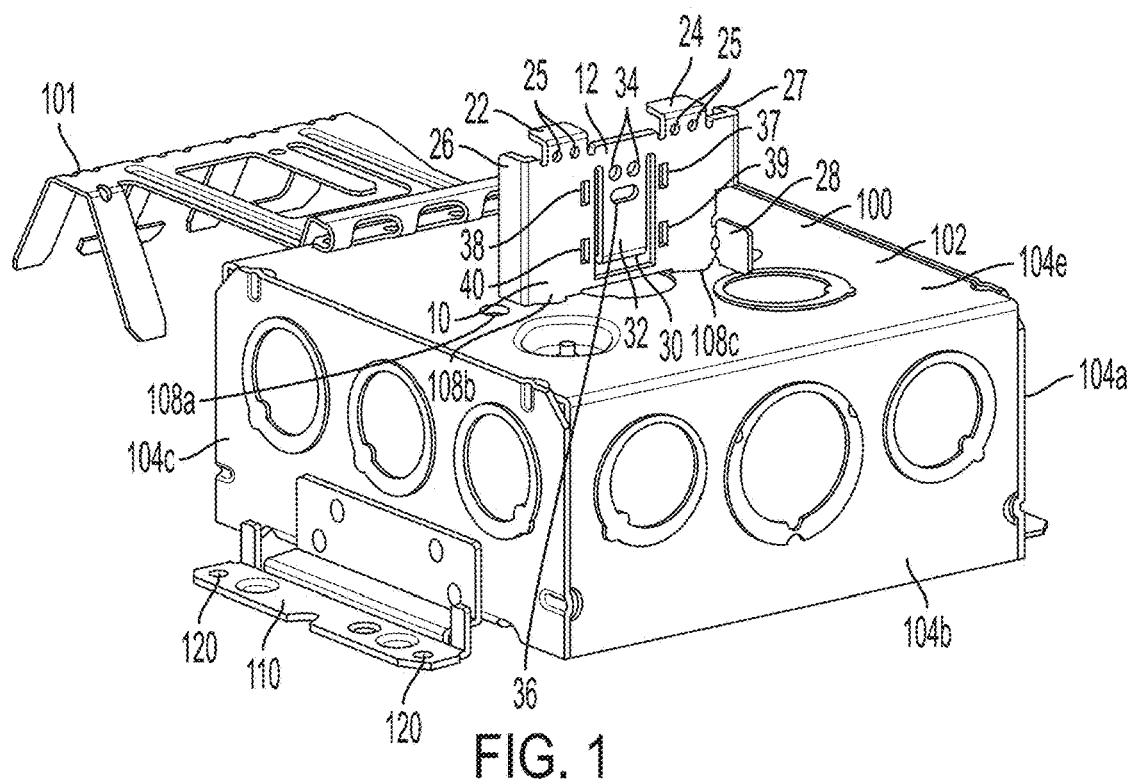
FIG. 1 is a bottom perspective view of an exemplary embodiment of an electrical box assembly having a support according to the present disclosure in a first installed position.
Figure 2:
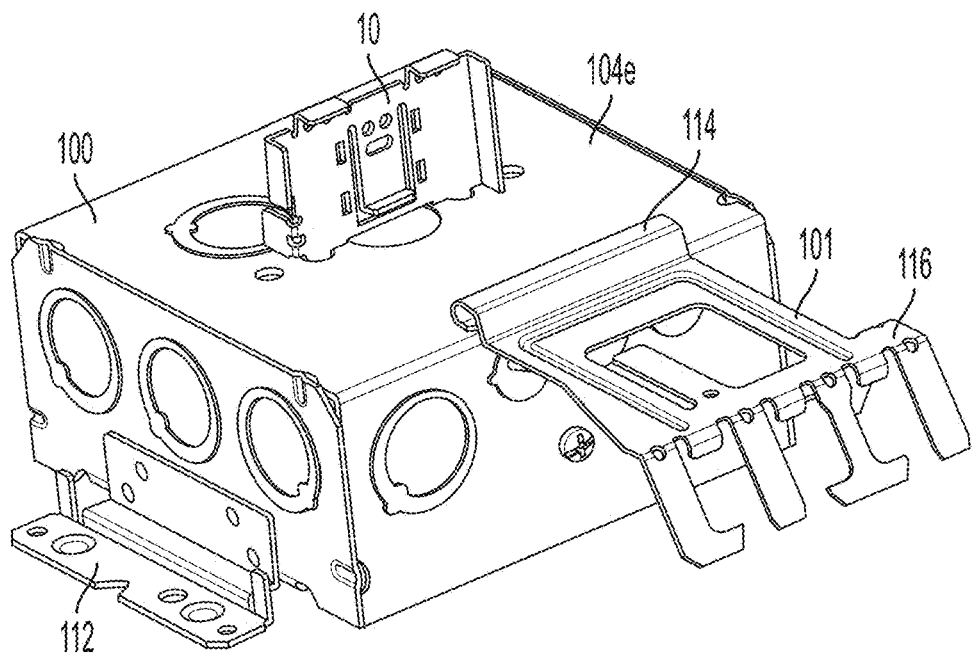
FIG. 2 is a top perspective view of FIG. 1.
Figure 3:
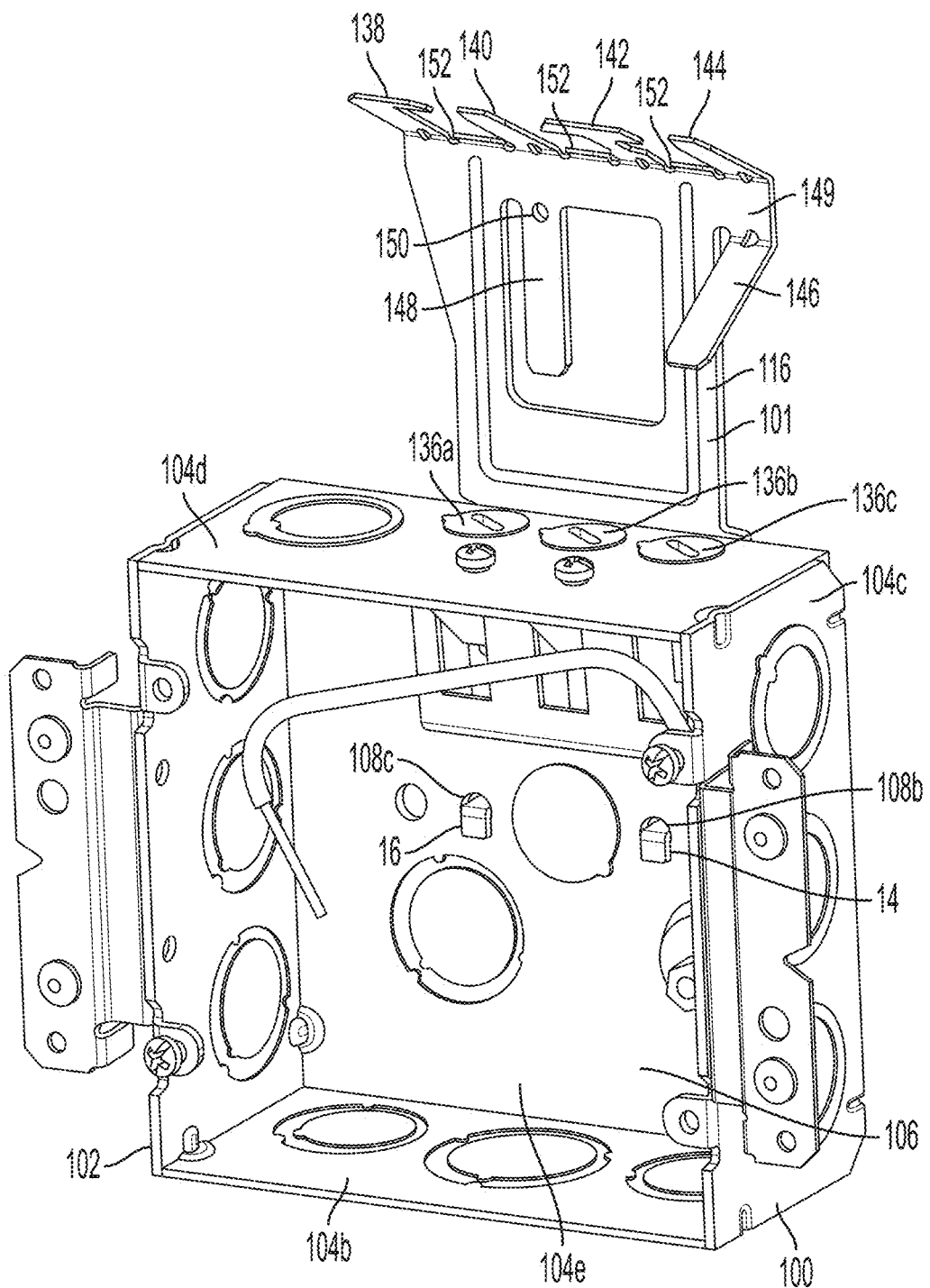
FIG. 3 is a front perspective view of FIG. 1.

Referring to the drawings and in particular to FIGS. 1-3, an exemplary embodiment of an electrical box assembly according to the present disclosure is shown and is generally referred to by reference numeral 100. Electrical box assembly 100 has a box body 102 that is connected to a support 10 that is shown in a first installed position in FIGS. 1-3.

Advantageously, support 10 can be adjusted to different installed positions so that support 10 is a stabilizer that features selectable appendages for various stud depths. The studs can be various materials, for example, metal or wood. Accordingly, support 10 eliminates extra box mounting brackets, by incorporating a universal stabilizer into electrical box assembly 100.

A further advantage of electrical box assembly 100 is a cable support bracket 101 that moves from a shipping position to an installed position. In the shipped position, cable support bracket 101 can be positioned adjacent box body 102 to minimize damage to cable support bracket 101 prior to installation. Cable support bracket 101 can be moved away from box body 102 to the installed position for use. Cable support bracket 101 is also connected to a rear portion of box body 102 of electrical box assembly 100 so that cable support bracket 101 does not extend beyond box body 102 in the shipped position to further minimize damage prior to installation.

Electrical box assembly 100 can be made of any desired material having sufficient strength and rigidity to enclose and/or support the devices, wires and connections placed therein. In some embodiments, electrical box assembly 100 is formed of carbon steel or galvanized steel. Cable support bracket 101 is of a material that allows bending between the folded and unfolded positions, for example, galvanized carbon steel that is greater than 0.030 inch and less than 0.040 inch thicknesses. In some embodiments, electrical box assembly 100 can be painted or powder coated as needed. Support 10 is a material that allows bending while still being a robust material. Support 10 is, for example, galvanized steel that is greater than 0.051 inch, and, can be 0.062 inch galvanized steel.

In FIGS. 1-5, support 10 is shown in the first installed position of six installed positions on electrical box assembly 100 for a first stud depth, for example, a stud depth of 3.625 inches. Electrical box assembly 100 has box body 102. Box body 102 encloses and/or supports the electrical devices, wires and connections. Box body 102 forms five sides 104a-e and an opening 106 that is shown in FIG. 3. Five sides 104a-e have one or more holes 108a-c. Box body 102 includes various other features to enclose and/or support the electrical devices, cables, wires and connections as is known in the art. Box body 102 can also be other known shapes known in the art.

Box body 102 is connected to a first bracket 110 as shown in FIG. 1 and a second bracket 112 as shown in FIG. 2. Alternatively, box body 102 can only have one of first bracket 110 and second bracket 112. First bracket 110 and second bracket 112 connect box body assembly 100 to another structure, for example, a stud, by one or more fasteners. Fasteners are, for example, screws or bolts and nuts, that pass through holes 120 in first bracket 110 and second bracket 112 aligned with holes in the stud.

Referring again to FIG. 1, support 10 has support body 12 and rear appendages 22, 24 extending from support body 12. Rear appendages 22, 24 are bent to be in the first installed position. Rear appendages 22, 24 each have holes 25. Support 10 has a first side projection 26 that extends from support body 12. Support 10 has an outer side projection 27 and a second side projection 28 that extends from support body 12 from a side that is opposite to first side projection 26. Support body 12 has a U-shaped opening 30 forming a flap 32. Support 10 has two holes 34 through flap 32. Flap 32 has an opening 36. Support body 12 has two openings 37, 39 and two openings 38, 40 on opposite sides of flap 32.

Referring to FIG. 2, cable support bracket 101 has a connection portion 114. Connection portion 114 is connected to side 104e of box body 102. Connection portion 114 has support portion 116. Support portion 116 is configured to connect cables and/or wires to electrical box assembly 100.

Referring to FIG. 3, support portion 116 of cable support bracket 101 has upper tab members 138, 140, 142, 144 that extend from an end opposite connection portion 114. Support portion 116 has a lower tab member 146 opposite upper tab member 144 and a lower tab member 148 opposite upper tab member 140. Support portion 116 has an open portion to form lower tab member 148. Upper tab members 138, 140, 142, 144 and lower tab members 146, 148 extend from a member support 149. Box body 102 also has pry-outs 136a-c.

Figure 4:
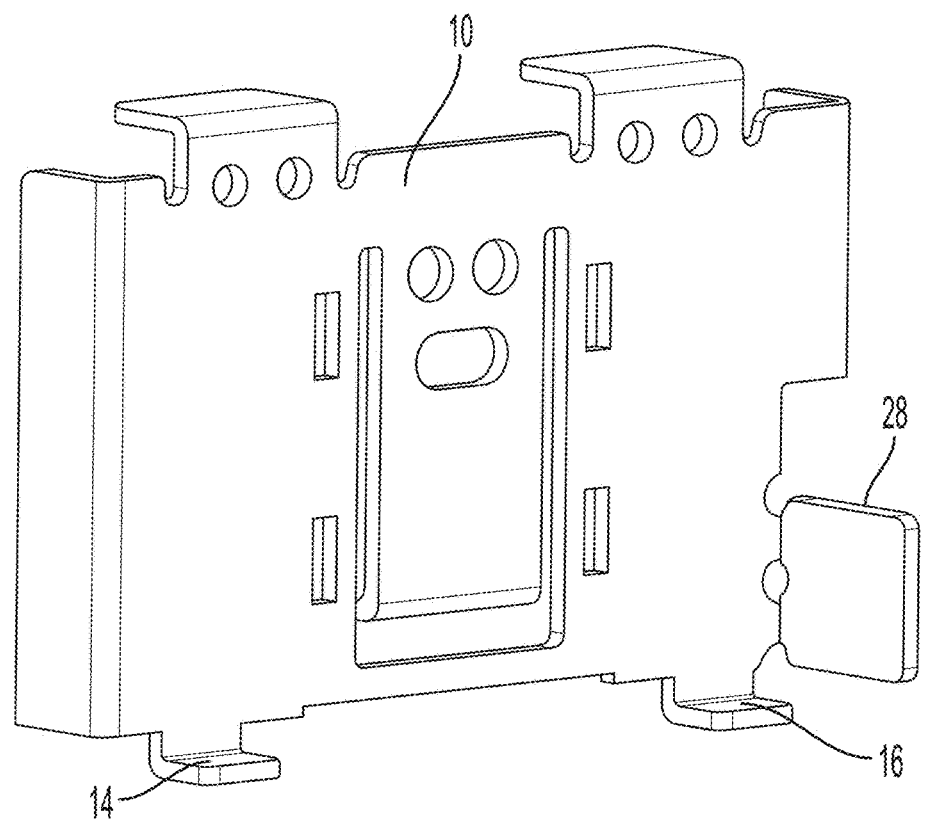
FIG. 4 is a bottom perspective view of the support of FIG. 1 in an installed configuration.
Figure 5:
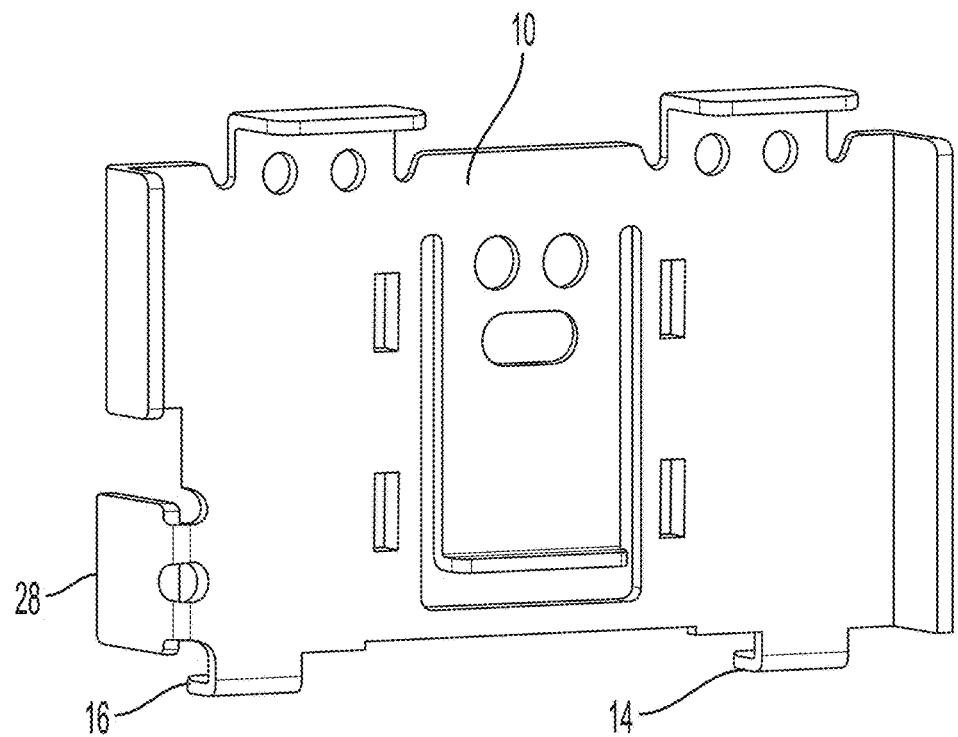
FIG. 5 is a top perspective view of FIG. 4.
Figure 13:
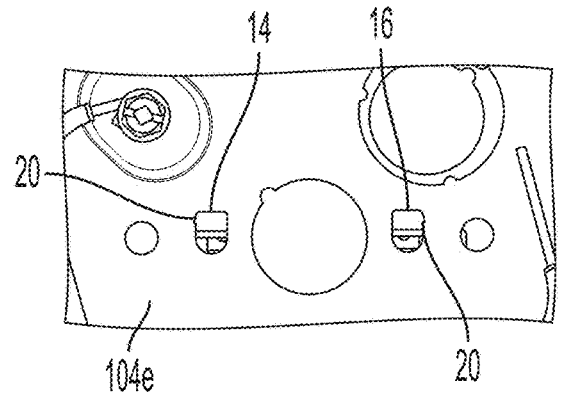
FIG. 13 is a partial enlarged front view of FIG. 1.

Referring to FIGS. 4 and 5, support 10 has a first hook 14 and a second hook 16. First hook 14 and second hook 16 are bent so they are angled relative to support body 12. Referring to FIG. 3, first hook 14 is through hole 108b and second hook 16 is through hole 108c. As shown in FIG. 13, first hook 14 and second hook 16 can each have a protuberance 20 so that first hook 14 is larger in size than hole 108b and second hook 16 is larger in size than hole 108c to maintain first hook 14 in hole 108b and second hook 16 in hole 108c that also maintains the connection between support 10 and box body 102.

Figure 6:
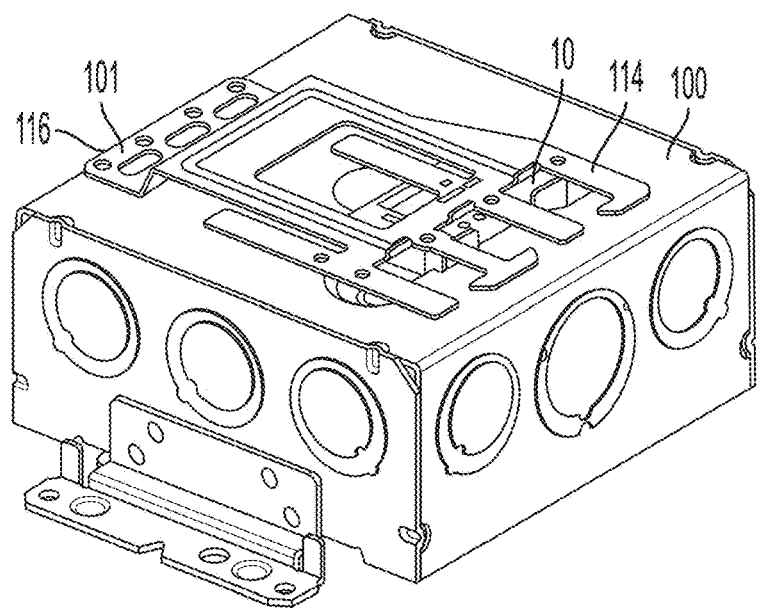
FIG. 6 is a bottom perspective view of the electrical box assembly having the support and a cable support bracket of FIG. 1 in a shipped position.
Figure 7:
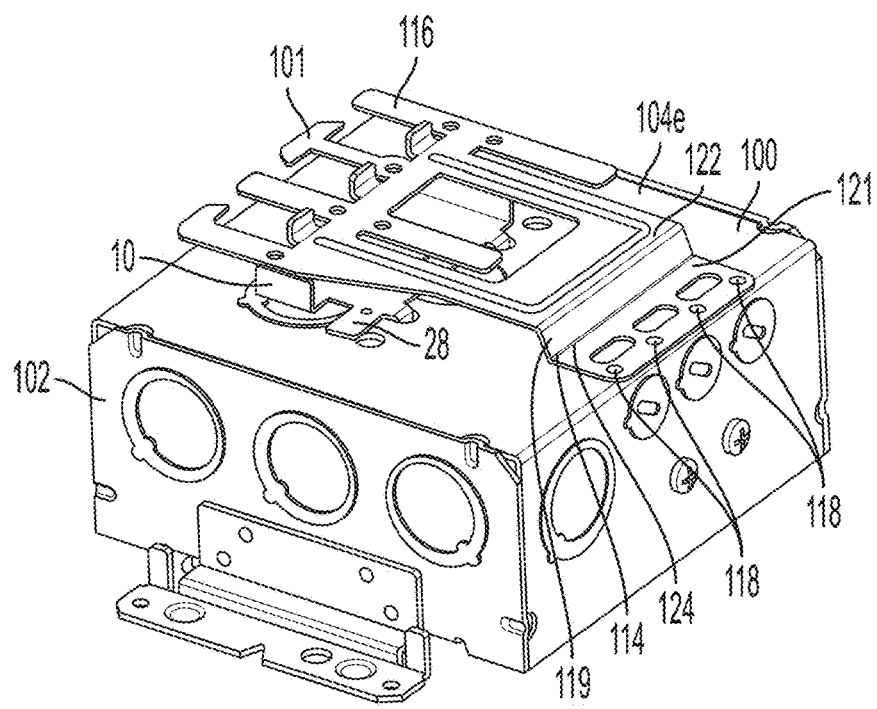
FIG. 7 is a top perspective view of FIG. 6.
Figure 8:
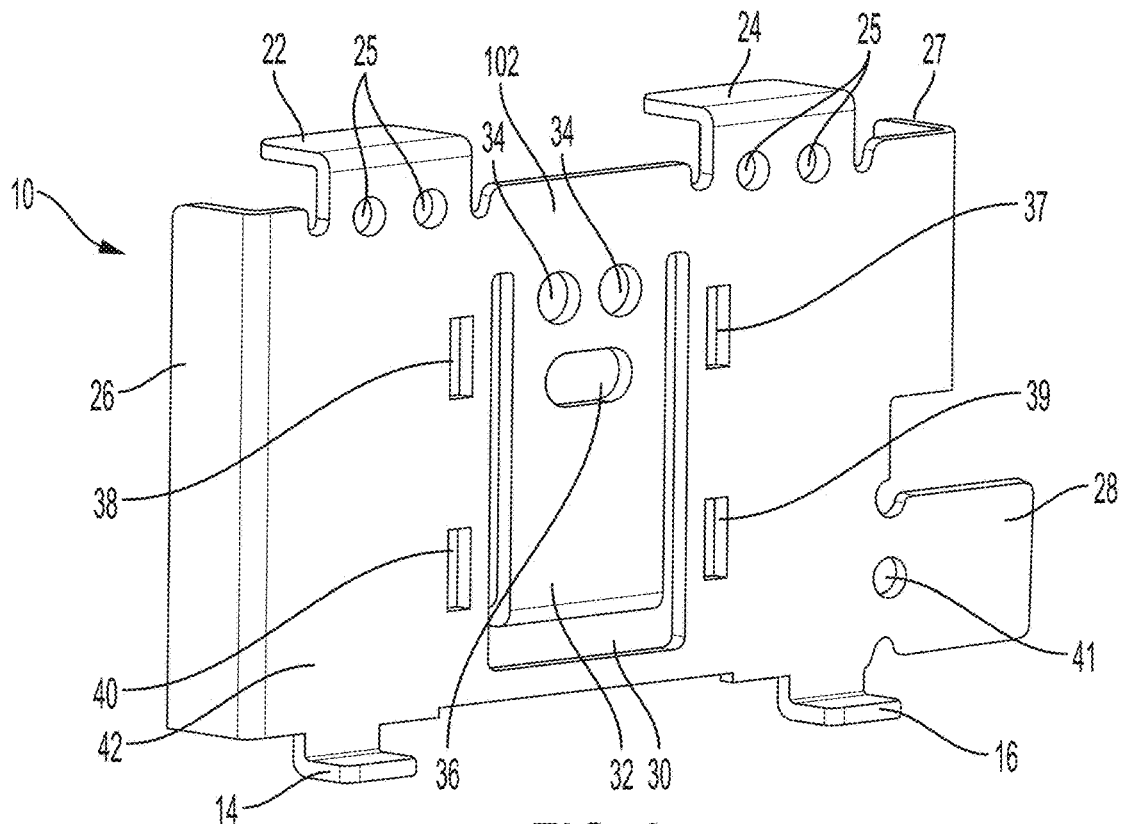
FIG. 8 is a bottom perspective view of the support of FIG. 1 in a shipped configuration.
Figure 12:
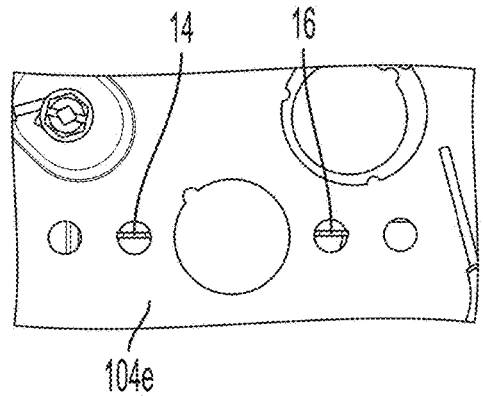
FIG. 12 is a partial enlarged front view of FIG. 6.

Referring to FIGS. 6 and 7, electrical box assembly 100, cable support bracket 101 and support 10 can be manufactured in a shipped position. The shipped position minimizes damage to electrical box assembly 100, cable support bracket 101 and support 10 prior to installation, and, in particular, during shipping. In the shipping position, support 10 has a side 42, as shown in FIG. 8, that is placed adjacent side 104e of box body 102 so that first hook 14 is though hole 108b and second hook 16 is through hole 108c as shown in FIG. 12. In the shipping position, cable support bracket 101 also helps to retain first hook 14 and second hook 16 in holes 108b and 108c.

Figure 9:
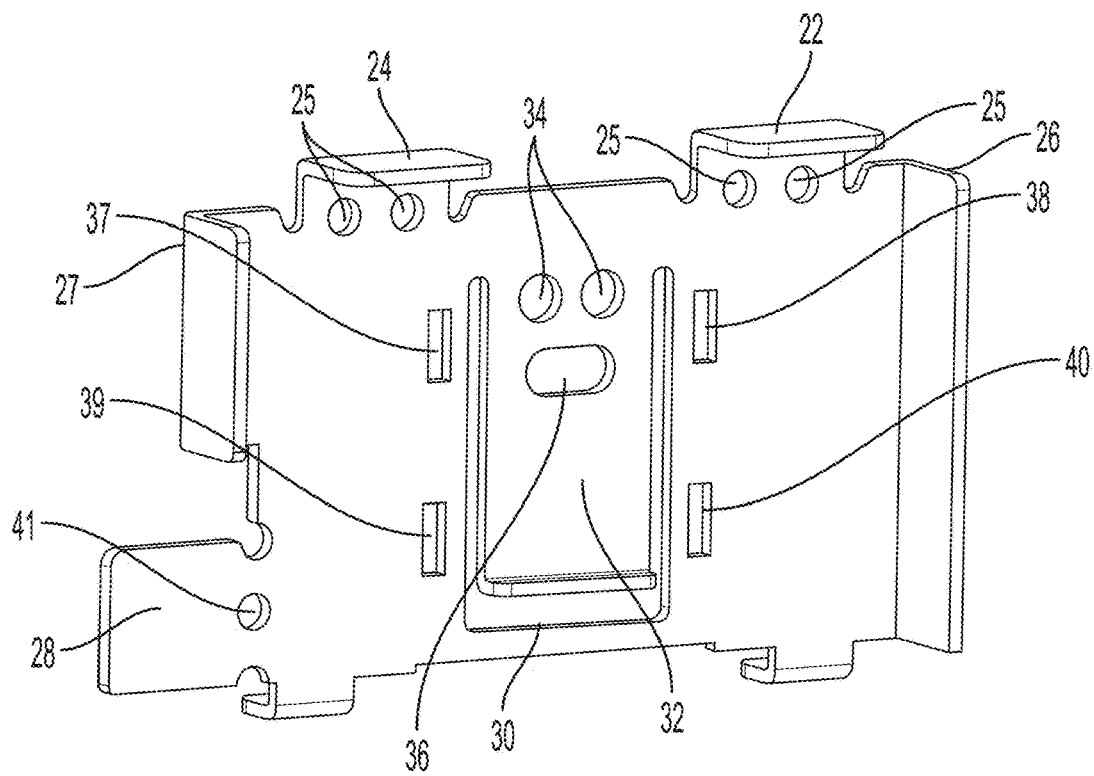
FIG. 9 is a top perspective view of FIG. 8.

Referring to FIGS. 8 and 9, support 10 has a shipped configuration where second side projection 28 is unbent. Support body 12 has a hole 41 at second side projection 28. The shipped configuration of support 10 allows second side projection 28 to be flat adjacent box body 102 in the shipped position of electrical box assembly 100 and support 10.

Figure 10:
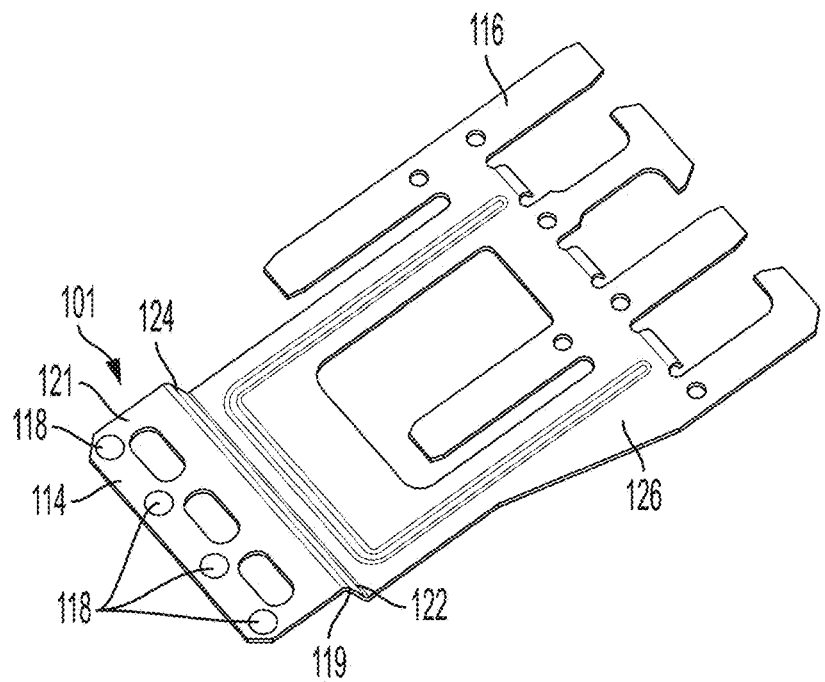
FIG. 10 is a front perspective view of the cable support bracket of the electrical box assembly of FIG. 1.
Figure 11:
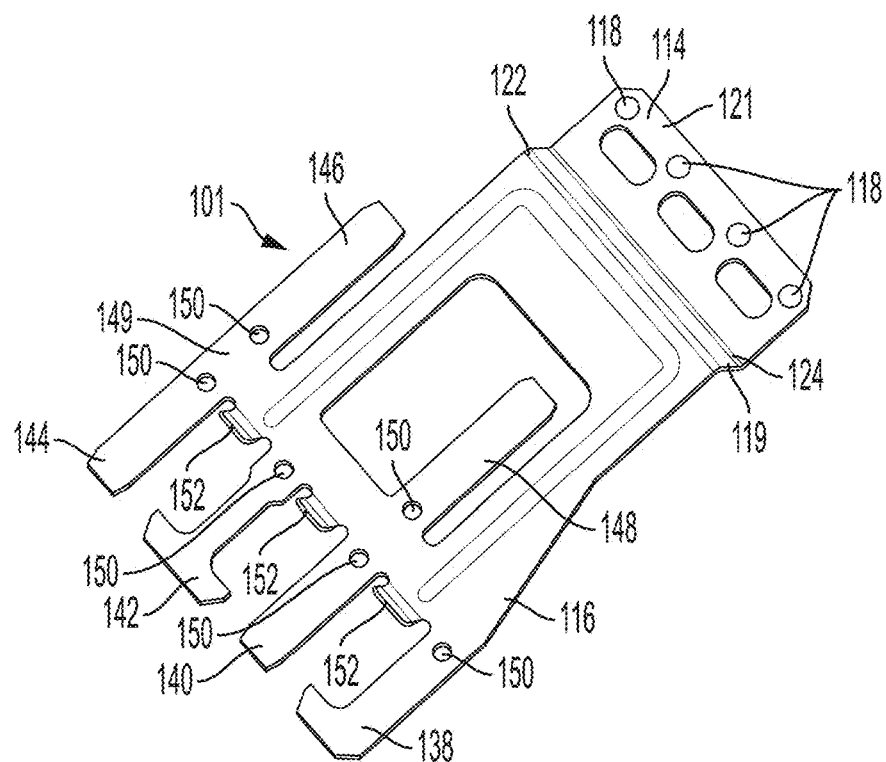
FIG. 11 is a rear perspective view of FIG. 10.

Referring to FIGS. 10 and 11, cable support bracket 101 has connection portion 114 and support portion 116. Connection portion 114 has a contact section 121 that is connected to box body 102, for example, by welding in four areas 118. Connection portion 114 has a connection section 119 between a first bend 122 and a second bend 124. As shown in FIG. 11, member support 149 has openings 150 at all of upper member tabs 138, 140, 142, 144 and lower member tabs 146, 148. Connection portion 114 has hooked members 152. Referring back to FIG. 7, contact section 121 of connection portion 114 is welded to box body 102 at four areas 118. Connection section 119 extends away from box body 102 to space support portion 116 away from box body 102 above support 10 so that a surface 126, as shown in FIG. 10, is adjacent support 10 in the shipped configuration.

Still referring to FIG. 7, to install electrical box assembly 100, cable support bracket 101 and support 10 that are in the shipped position on to a stud, a user moves support portion 116 away from box body 102 so that connection section 119 rotates along fold line 124 over contact section 121 and support portion 116 rotates along fold line 122 from the shipped position to the installed position as shown in FIG. 1. Support body 12 is then moved away from box body 102 from the shipped configuration, as shown in FIG. 7, to the first installed position, as shown in FIG. 1, when installing on a 3.625 inch stud; however, support can alternatively be in the second, third, fourth, fifth or sixth installed positions as described herein depending on the size of the stud. Referring to FIGS. 12 and 13, when support body 12 is moved from the shipped configuration to the first installed position, first hook 14 and second hook 16 move from the position in FIG. 12 to the position in FIG. 13. Referring to FIG. 9, second side projection 28 is then bent along hole 41 so that support 10 is in the first installed position as shown in FIG. 1. Second side projection 28 limits movement in a direction away from cable support bracket 101 and first side projection 26 limits movement toward cable support bracket 101 to maintain support 10 in the first installed position. First bracket 110 and/or second bracket 112 can then be connected to a stud that will be positioned between the front drywall panel and the rear drywall panel of the wall. Appendages 22, 24 in the first installed position of support 10 rests against the rear drywall panel when first bracket 112 and/or second bracket are connected to the stud to support electrical box assembly 100 in the installed position. The folded configuration of appendages 22, 24 minimize damage to the rear drywall panel.

To install cables once electrical box assembly 100, cable support bracket 101 and support 10 are in the installed position, as shown in FIG. 11, member support 149 has openings 150 at all of upper member tabs 138, 140, 142, 144 and lower member tabs 146, 148 so that upper member tabs 138, 140, 142, 144 and lower member tabs 146, 148 can be bent at openings 150 to desired positions to receive the cables. Referring to FIG. 3, pry-outs 136a-c are removed to uncover cable holes and a cable is placed through each cable hole. A first cable is positioned between upper tab member 138 and upper tab member 140 and through the cable hole uncovered by pry-out 136a. A second cable is positioned between upper tab member 140 and upper tab member 142 and through the cable hole uncovered by pry-out 136b. A third cable is positioned between upper tab member 142 and upper tab member 144 and through the cable hole uncovered by pry-out 136c. Lower tab member 148 can then be bent along opening 150 upward between the first cable and the second cable to maintain the cables in place so that member support 149 is between the rear drywall panel and the first, second and third cables. Hooked members 152 can engage cables that have outer surfaces that are corrugated. The cables can be received in RACO® STAB-IT® boxes.

Advantageously, the configuration of support 10 allows use of material that is more robust than typical supports given the shape of support 10. The shipped position allows electrical box assembly 100, cable support bracket 101 and support 10 to be prefabricated in the shipped position to minimize damage prior to installation. Connecting cable support bracket 101 to the rear of box body 10 so that cable support bracket 101 does not extend beyond box body 102 in the shipped position also helps to minimize damage prior to installation.

Figure 14:
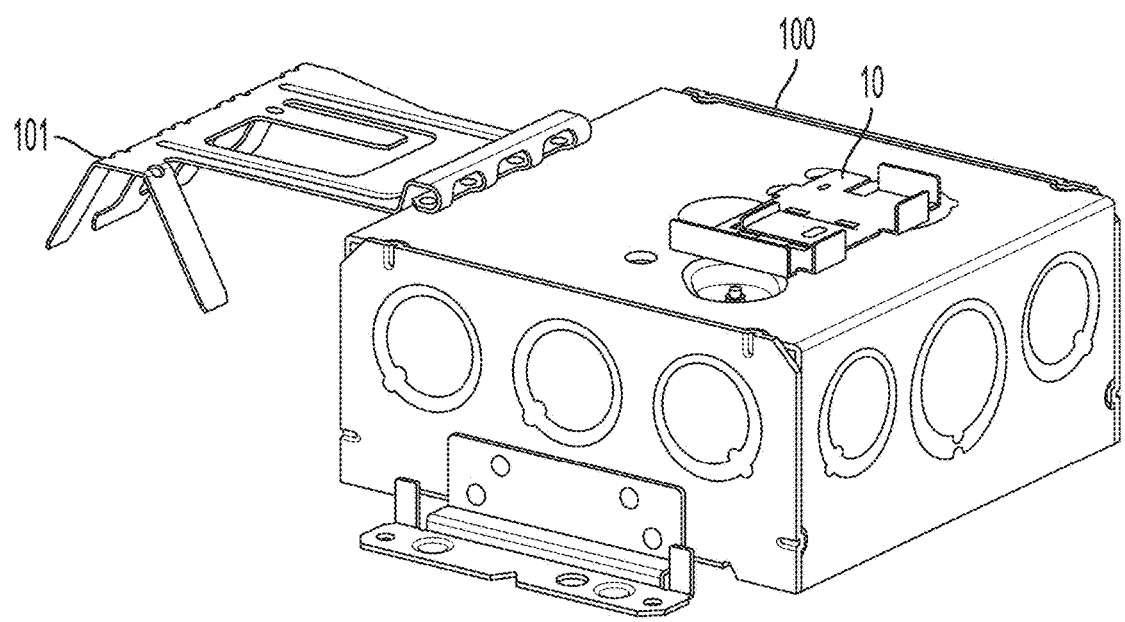
FIG. 14 is a bottom perspective view of the electrical box assembly having the support in a second installed position.
Figure 15:
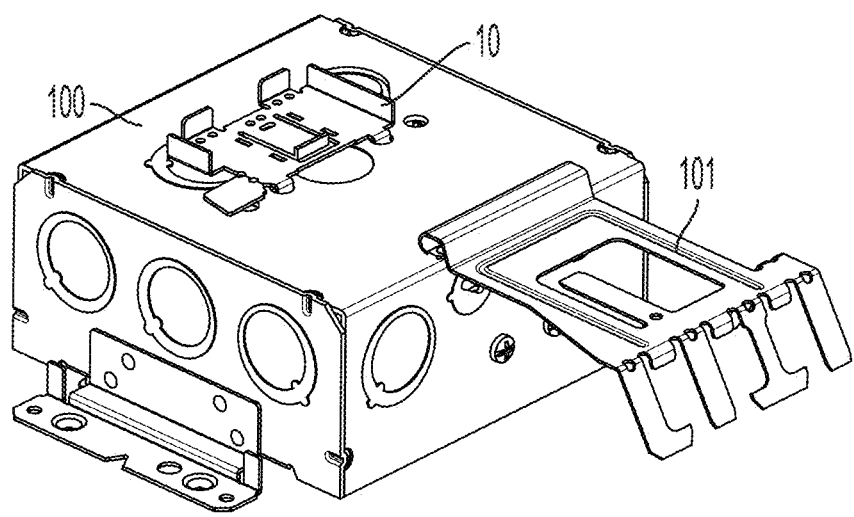
FIG. 15 is a top perspective view of FIG. 14.
Figure 16:
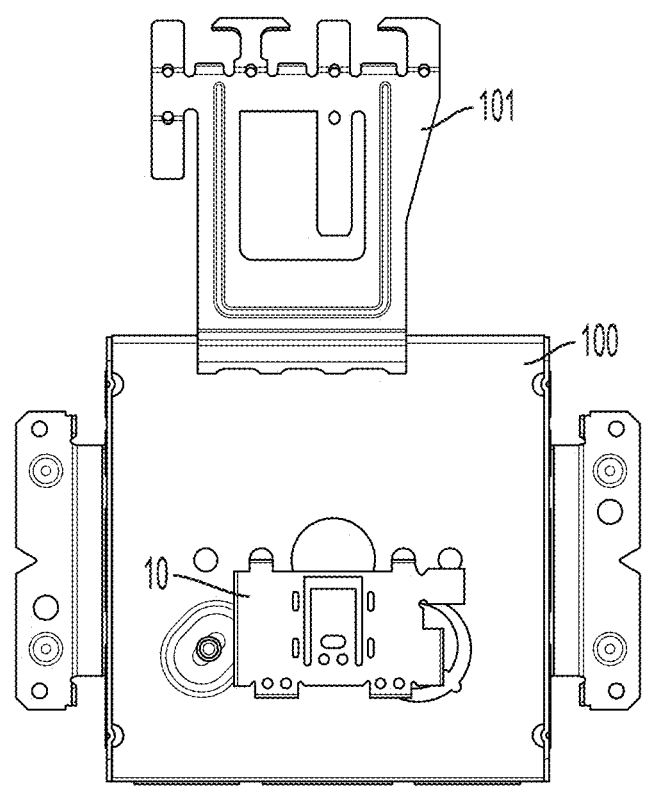
FIG. 16 is a rear view of FIG. 14.

Referring to FIGS. 14-16, electrical box assembly 100 and support 10 are shown in a second installed position instead of the first installed position. The second installed position is the same as the first installed position of FIGS. 1-13 except when moving from the shipped position to the second installed position, support 10 stays in the shipped configuration. For example, a user can use support 10 in the second installed position instead of the first installed position when the stud is narrower than when using the first installed position such as a 2.5 inch stud. When installed on the 2.5 inch stud, support 10 will rests against the rear drywall panel in the second installed position when first bracket 110 and/or second bracket 112 are connected to the stud to support electrical box assembly 100.

Figure 17:
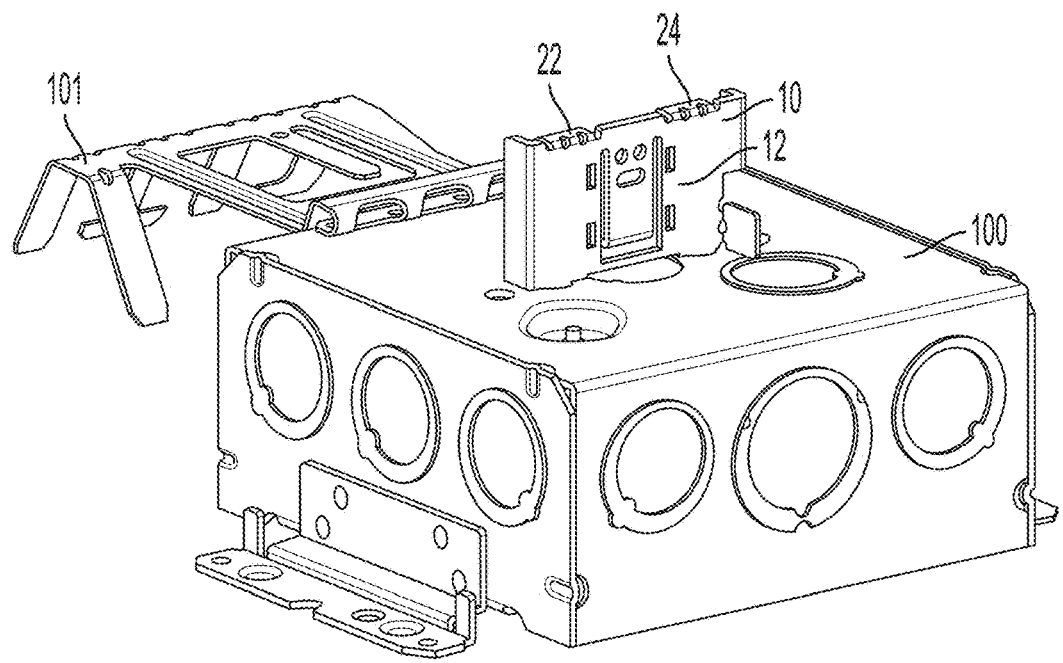
FIG. 17 is a bottom perspective view of the electrical box assembly having the support in a third installed position.
Figure 18:
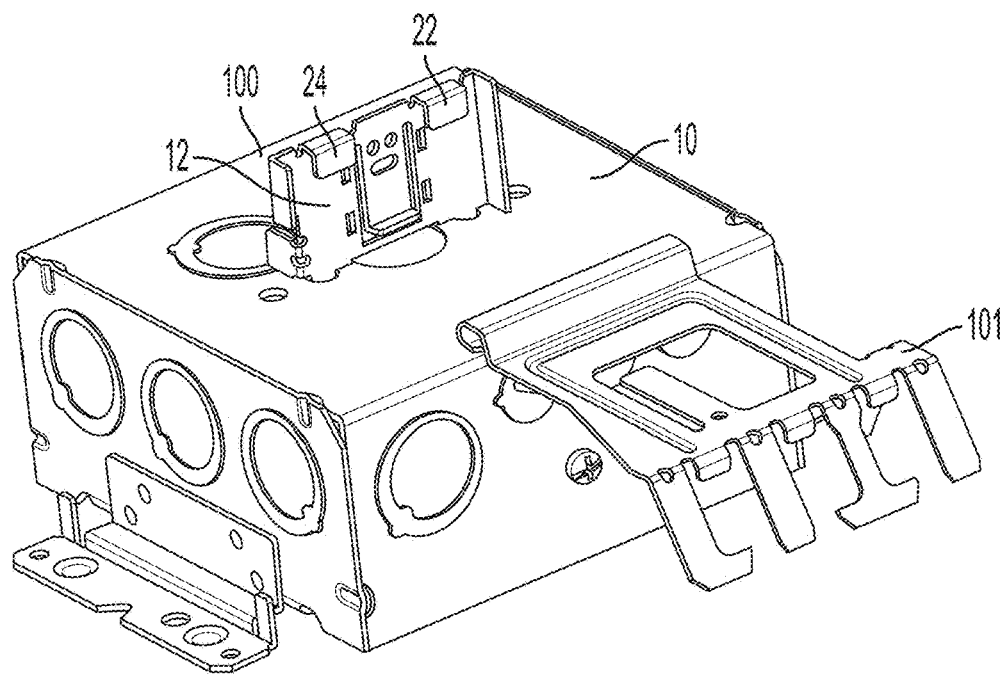
FIG. 18 is a top perspective view of FIG. 17.

Referring to FIGS. 17-18, electrical box assembly 100 and support 10 are show in a third installed position instead of the first installed position. The third installed position is the same as the first installed position of FIGS. 1-13 except rear appendages 22, 24 are bent along holes 25 to be adjacent support body 12. For example, a user can move support 10 into the third installed position instead of the first installed position when the stud is narrower than when using the first installed position such as a 3.5 inch stud. When installed on the 3.5 inch stud, rear appendages 22, 24 will rest against the rear drywall panel in the third installed position when first bracket 110 and/or second bracket 112 are connected to the stud to support electrical box assembly 100.

Figure 19:
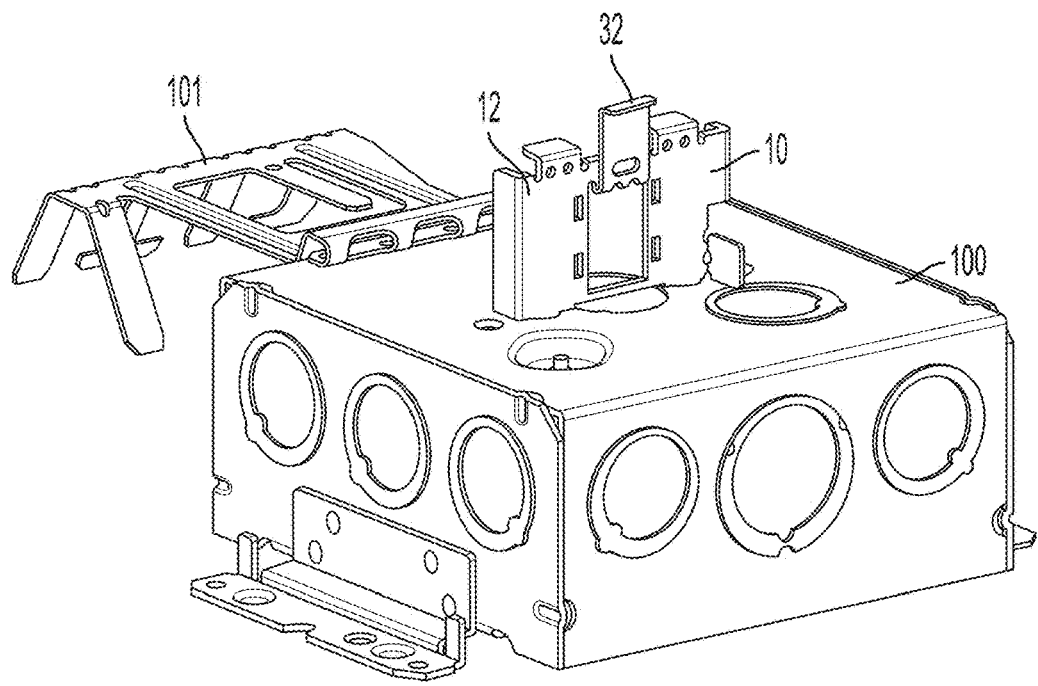
FIG. 19 is a bottom perspective view of the electrical box assembly having the support in a fourth installed position.
Figure 20:
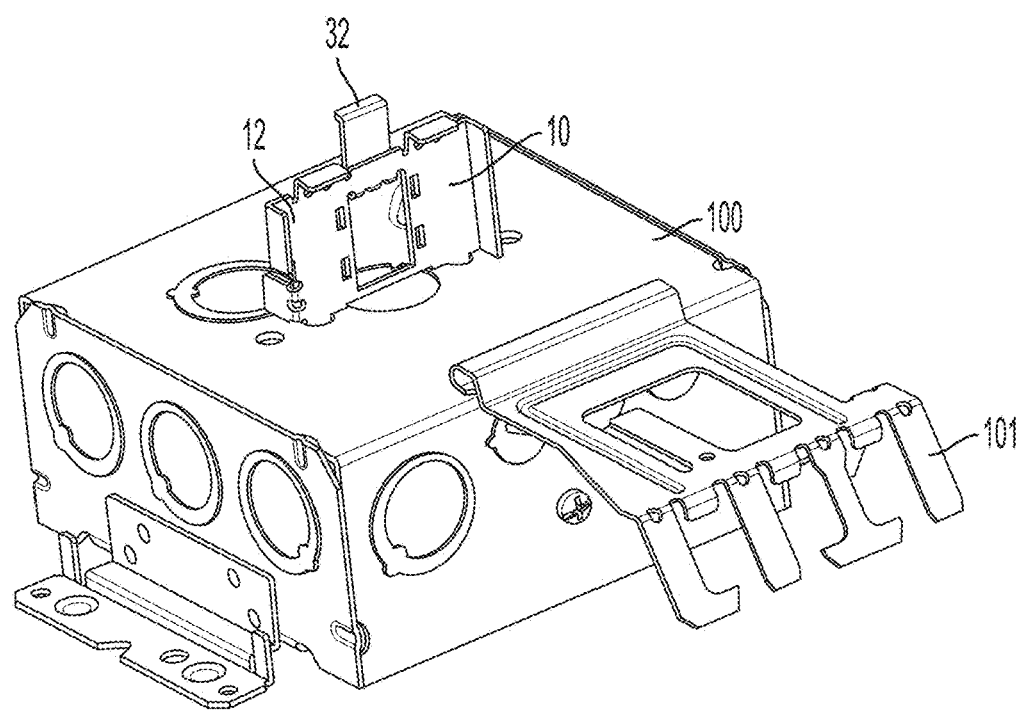
FIG. 20 is a top perspective view of FIG. 19.

Referring to FIGS. 19-20, electrical box assembly 100 and support 10 are show in a fourth installed position instead of the first installed position. The fourth installed position is the same as the first installed position of FIGS. 1-13 except flap 32 is bent along two holes 34 away from box body 102 to extend above a remainder of support body 12. For example, a user can move support 10 into the fourth installed position instead of the first installed position when the stud is wider than when using the first installed position such as a 4.5 inch stud. When installed on the 4.5 inch stud, flap 32 will rest against the rear drywall panel in the fourth installed position when first bracket 110 and/or second bracket 112 are connected to the stud to support electrical box assembly 100.

Figure 23:
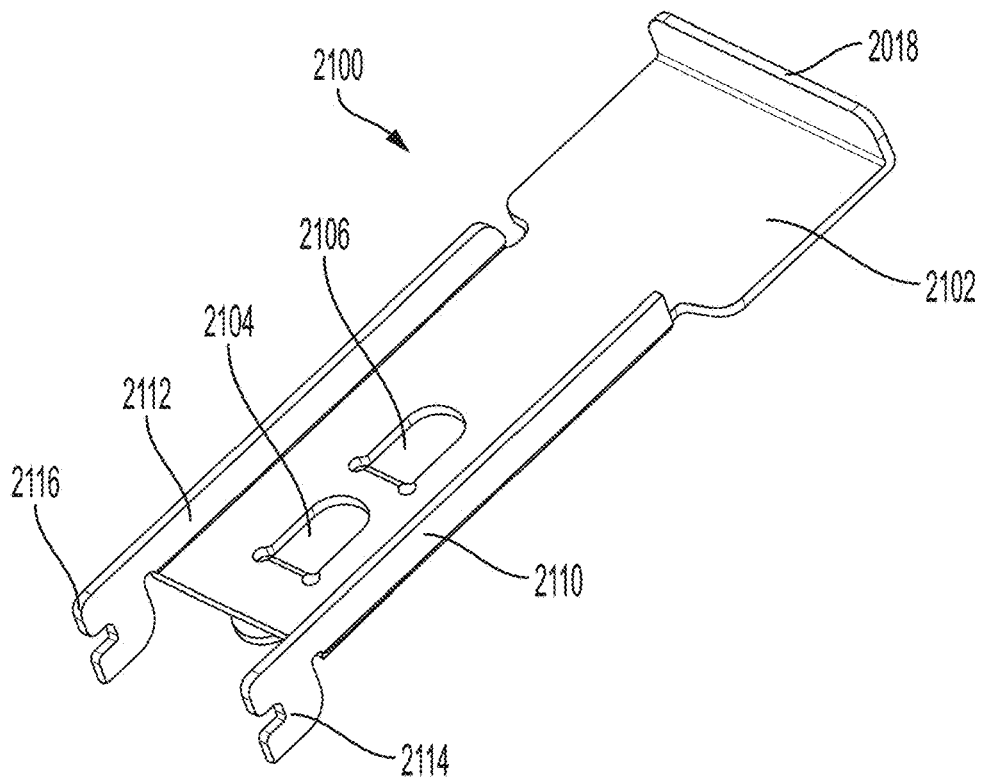
FIG. 23 is a bottom perspective view of the support extension of FIG. 21.
Figure 24:
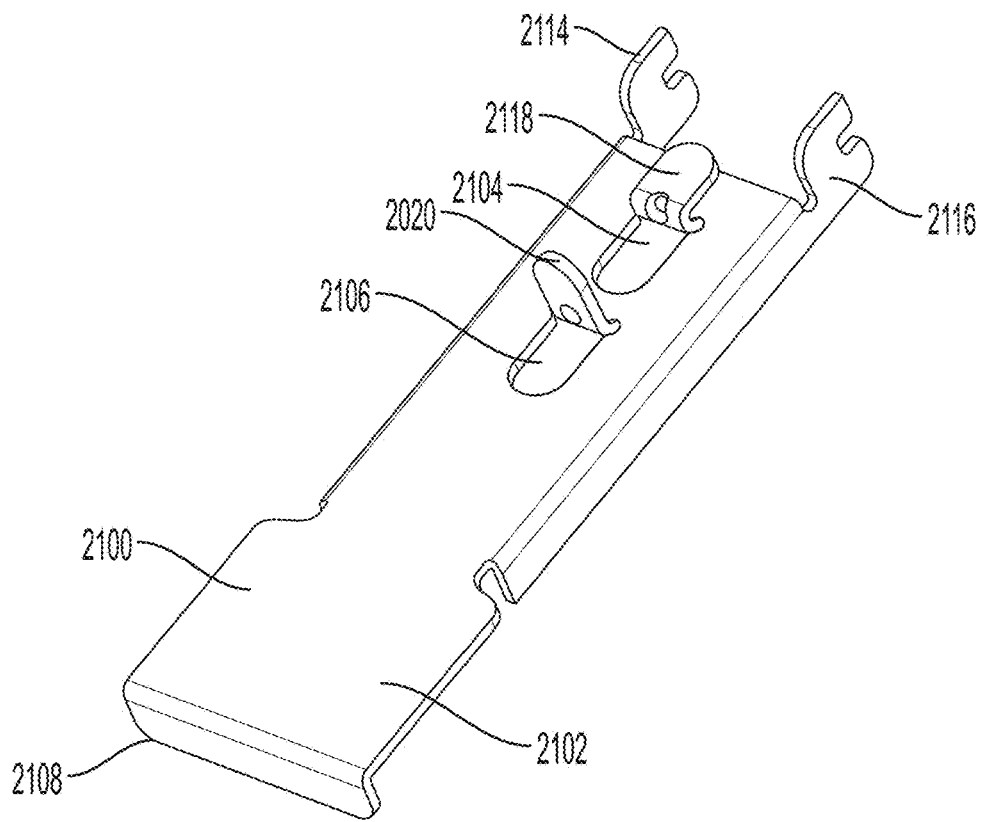
FIG. 24 is a top perspective view of FIG. 23.

Referring to FIGS. 21-24, electrical box assembly 100 and support 10 are show in a fifth installed position instead of the first installed position. The fifth installed position is the same as the first installed position of FIGS. 1-13 except a support extension 2100 is connected to support 10. Referring to FIGS. 23-24, support extension 2100 has a support extension body 2102. Support extension 2100 has a first opening 2104 and a second opening 2106 through extension body 2102. Extension body 2102 has fold 2108 at a first end. Extension body 2102 has ridges 2110, 2112 on opposite sides. A c-shaped member 2114 is at an end of ridge 2110. A c-shaped member 2116 is at an end of ridge 2112. First opening 2104 has a tab 2118 extending therefrom. Second opening 2106 has a tab 2020 extending therefrom. Tabs 2118 and 2020 each have an extended position as shown by tab 2020 in FIG. 24 and a bent position as shown by tab 2118 in FIG. 24. Referring back to FIGS. 21-22, to connect support extension 2100 to support 10 in the fifth installed position, c-shaped member 2116 is extended through opening 39 of support 10 and c-shaped member 2114 is extended through opening 40 of support 10. Tab 2118 is unfolded in the extended position to be extended through opening 36 of support 10 and then tab 2118 is moved to the bent position. Tab 2020 is bent over support body 12 from the extended position to the bent position between rear appendages 22, 24 and clamped into place on support 10. A user can move support 10 into the fifth installed position instead of the first installed position when the stud is wider than when using the first installed position, for example, the stud is a 5.5 inch stud. When installed on the 5.5 inch stud, fold 2108 rests against the rear drywall panel in the fifth installed position when first bracket 112 and/or second bracket are connected to the stud to support electrical box assembly 100.

Figure 25:
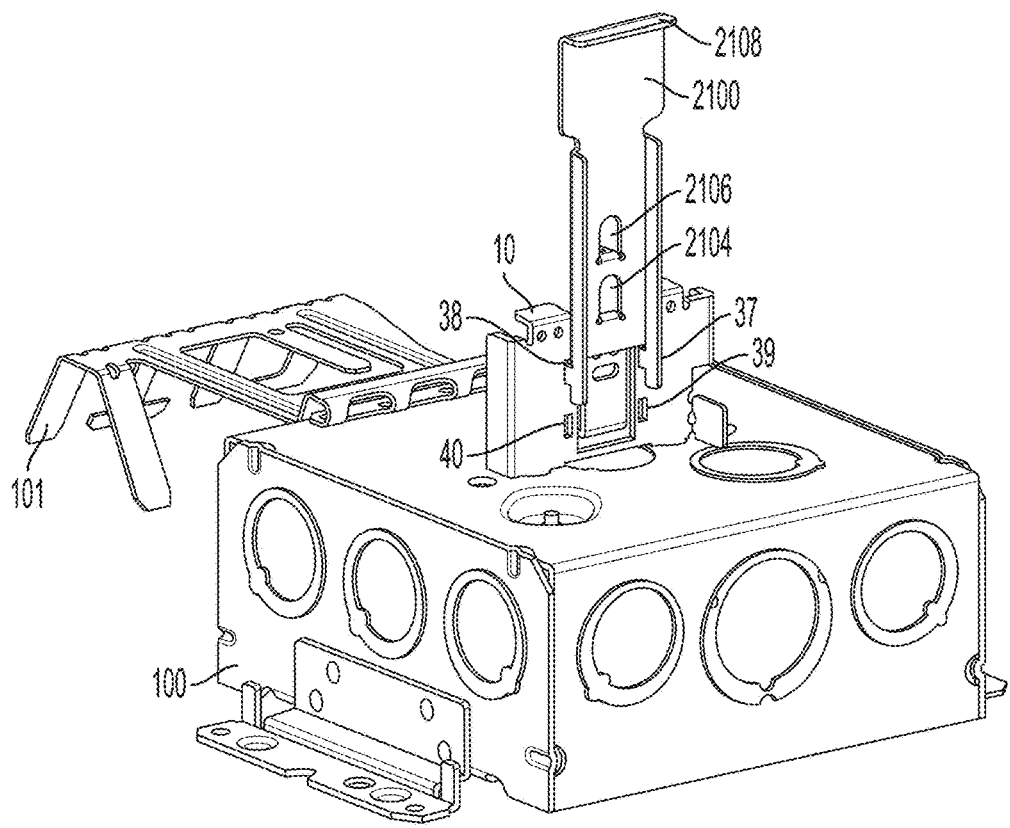
FIG. 25 is a bottom perspective view of the electrical box assembly having the support in a sixth installed position with the support extension connected to the support in a second connected position.
Figure 26:
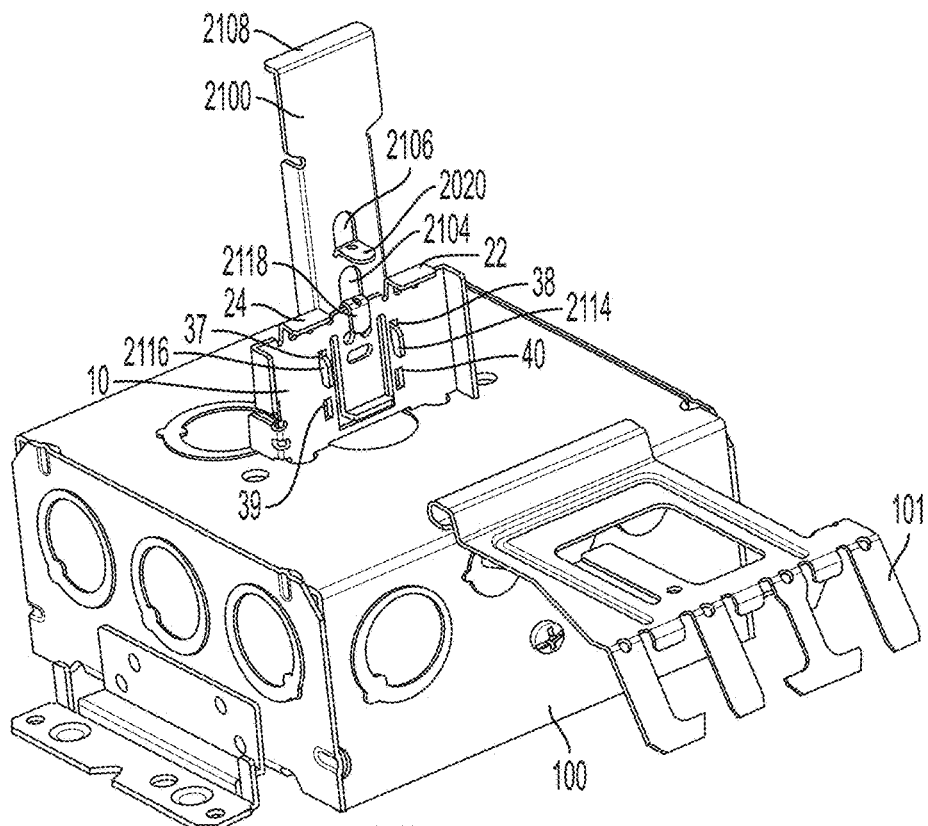
FIG. 26 is a top perspective view of FIG. 25.

Referring to FIGS. 25-26, electrical box assembly 100 and support 10 are show in a sixth installed position instead of the first installed position. The sixth installed position is the same as the fifth installed position of FIGS. 21-24 except support extension 2100 is connected in a different position. To connect support extension 2100 to support 10 in the sixth installed position, c-shaped member 2116 is extended through opening 37 of support 10 and c-shaped member 2114 is extended through opening 38 of support 10. Tab 2118 is then bent over support body 12 from the extended position to the bent position between rear appendages 22, 24 and clamped into place on support 10. A user can move support 10 into the sixth installed position instead of the first installed position when the stud is wider than when using the first installed position, for example, the stud is a 6 inch stud. When installed on the 6 inch stud, fold 2108 rests against the rear drywall panel in the fifth installed position when first bracket 112 and/or second bracket are connected to the stud to support electrical box assembly 100.

Figure 21:
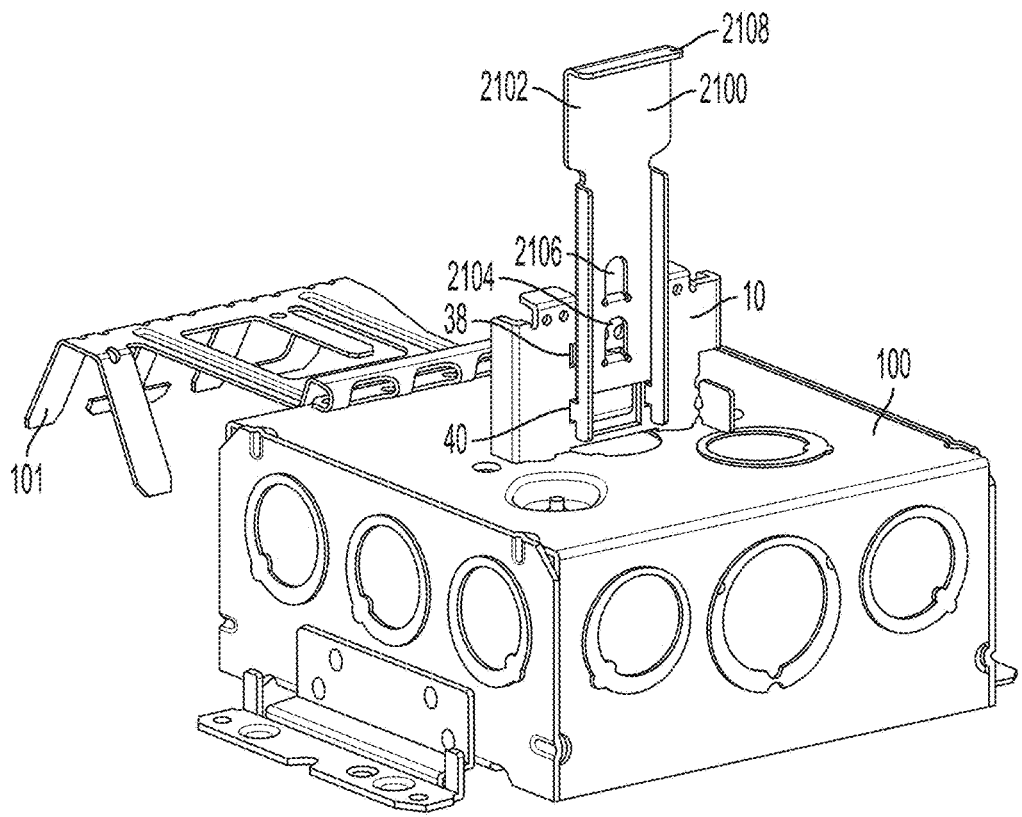
FIG. 21 is a bottom perspective view of the electrical box assembly having the support in a fifth installed position with a support extension connected to the support in a first connected position.
Figure 22:
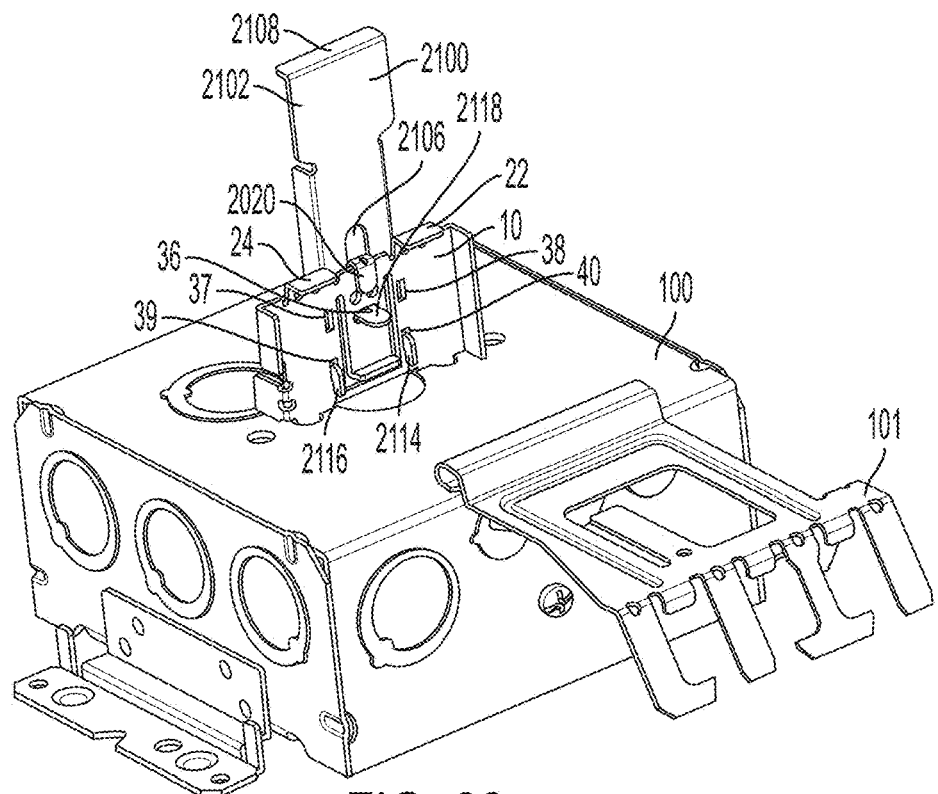
FIG. 22 is a top perspective view of FIG. 21.

Accordingly, support 10 can be adjusted to different installed positions, namely, the first installed position of FIG. 1, the second installed position of FIG. 14, the third installed position of FIG. 17, the fourth installed position of FIG. 19, the fifth installed position of FIG. 21 and the sixth installed position of FIG. 25, so that support 10 accommodates various stud depths. Accordingly, support 10 eliminates extra box mounting brackets, by incorporating a universal stabilizer into electrical box assembly 100. Support 10 is a plate that includes feet, namely, first hook 14 and second hook 16, designed to engage with a NEMA hole pattern in box body 102, and is supplied flat to the back of box body 102 to save shipping space. Support 10 is a plate that is hinged 90 degrees and second side projection 28 is bent 90 degrees to lock support 10 in position. No other alterations are required for 3⅝ inch studs. Other tabs, namely, rear appendages 22, 24 and flap 32, are bent to accommodate 3½ inch or 4 inch studs. A separate extension, namely, support extension 2100, is available and locks in place for 5½ inch and 6 inch studs.

Figure 27:
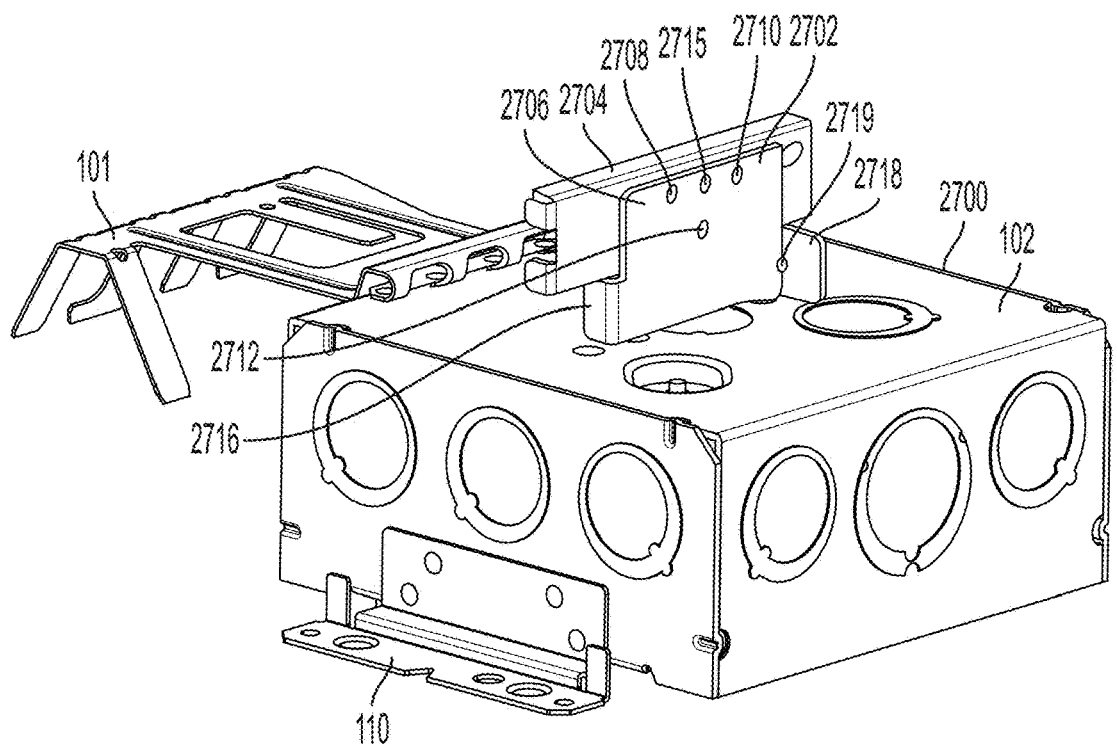
FIG. 27 is a bottom perspective view of an exemplary embodiment of a second embodiment of an electrical box assembly having a support base and a support base extension according to the present disclosure in a first installed position.
Figure 28:
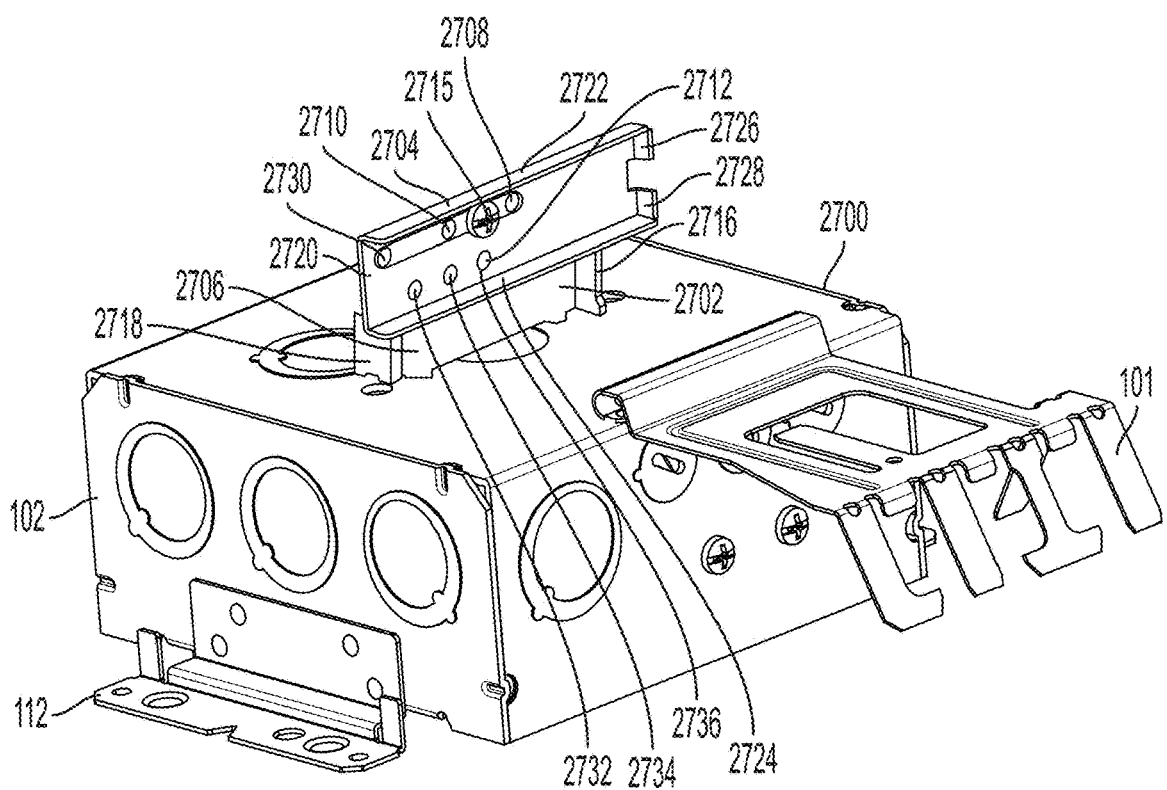
FIG. 28 is a top perspective view of FIG. 27.

Referring to FIGS. 27-28, a second embodiment of an electrical box assembly according to the present disclosure is shown and is generally referred to by reference numeral 2700. Electrical box assembly 2700 is the same as box assembly 100 except has a support base 2702 and a support base extension 2704 instead of support 10 and support extension 2100. Accordingly, features that are the same for electrical box assembly 2700 and electrical box assembly 100 have the same reference numerals.

Figure 30:
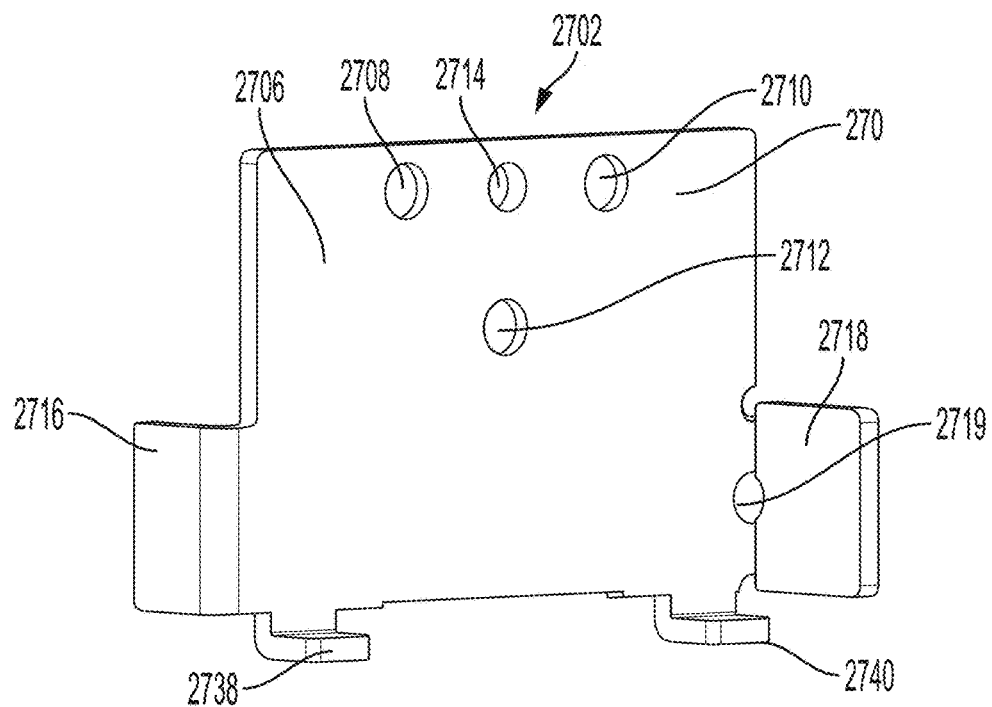
FIG. 30 is a bottom perspective view of the support base of FIG. 27 in an installed configuration.

Support base 2702 and support extension 2704 are shown in the first installed position of six installed positions on electrical box assembly 2700 for a first stud depth, for example, a stud depth of 3.625 inches. Support base 2702 has support base body 2706. Support base body 2706 has protuberances 2708, 2710, 2712 and an opening 2714, as shown in FIG. 30, between protuberances 2708, 2710. Support base 2702 has a first side projection 2716 on a first side and a second side projection 2718 on a second side that is opposite the first side. Second side projection 2718 is bent along a hole 2719.

Referring to FIG. 28, support base extension 2704 has a support extension body 2720 having support ridges 2722, 2724 on opposite sides of support extension body 2720. Support base extension 2704 has a tab member 2726 at an end of support ridge 2722. Support base extension 2704 has a tab member 2728 at an end of support ridge 2724. Support base extension 2704 has an elongated opening 2730 through support extension body 2720 adjacent support ridge 2722. Support base extension 2704 has holes 2732, 2734, 2736 through support extension body 2720 adjacent support ridge 2724. In the first installed position, protuberances 2708, 2710 of support base 2702 are through elongated opening 2730 of support base extension 2704 and protuberance 2712 of support base 2702 is through hole 2736 of support base extension 2704. A fastener 2715, for example, a screw, passes through elongated opening 2730 of support base extension 2704 and opening 2714 of support base 2702 to secure support base 2702 and support base extension 2704 together in the first installed position.

Figure 29:
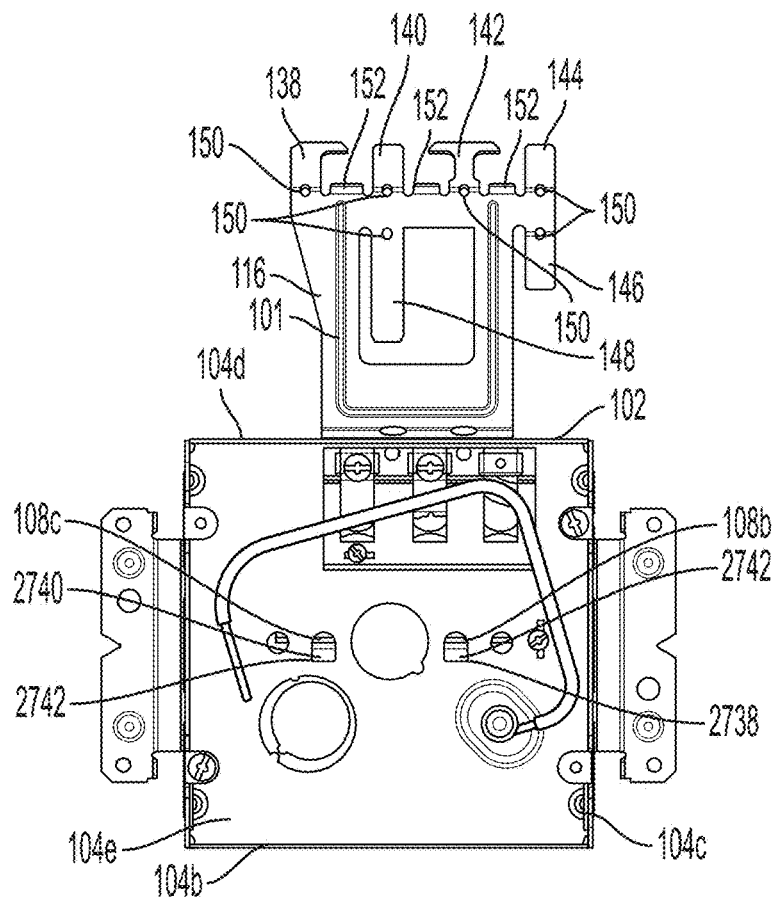
FIG. 29 is a front perspective view of FIG. 27.
Figure 31:
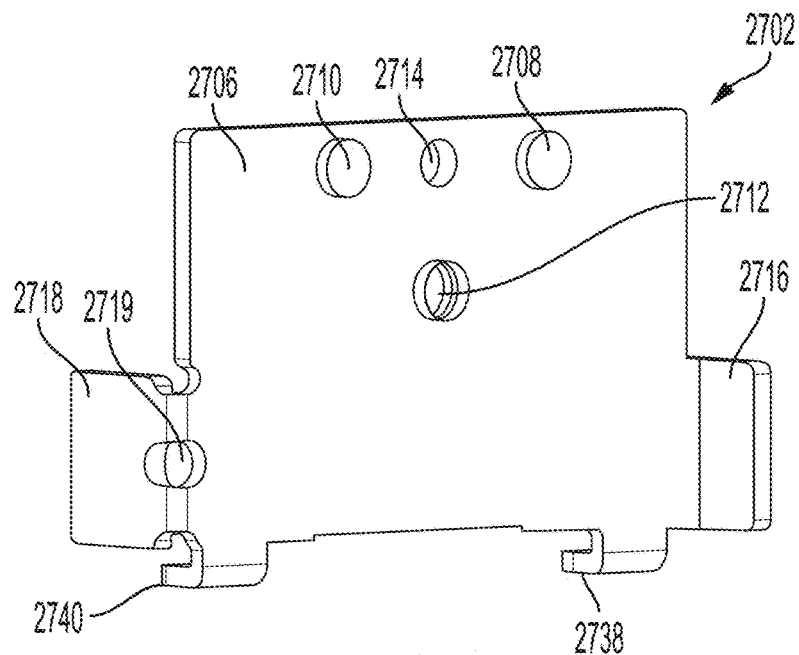
FIG. 31 is a top perspective view of FIG. 30.
Figure 32:
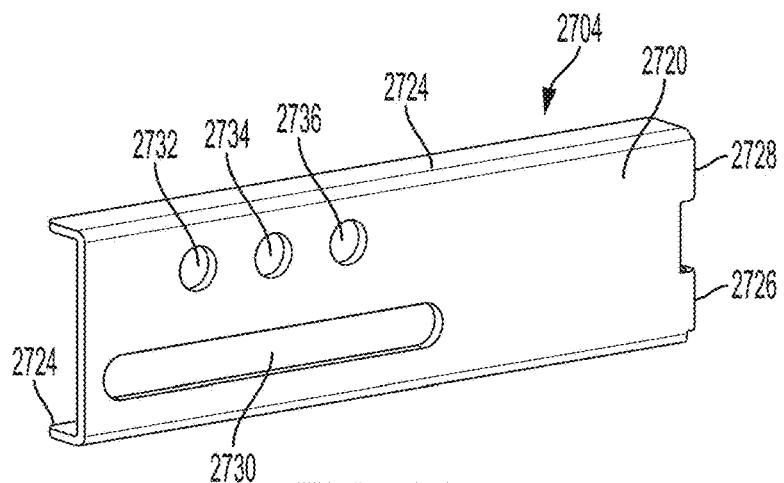
FIG. 32 is a bottom perspective view of the support base extension of FIG. 27.
Figure 33:
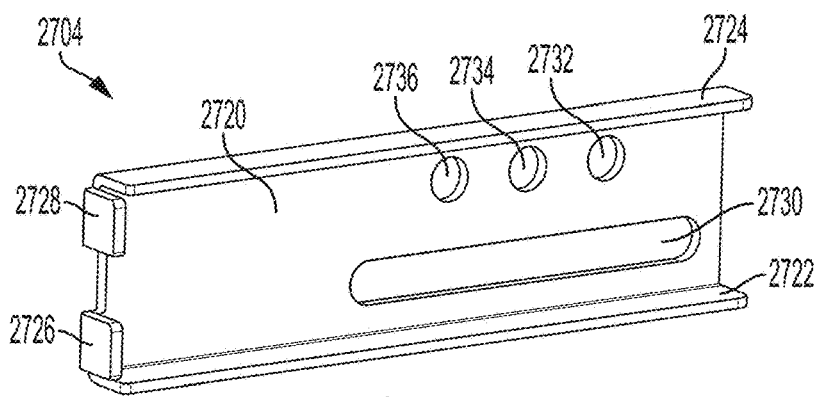
FIG. 33 is a top perspective view of FIG. 32.

Referring to FIG. 29-31, support base 2700 has a first hook 2738 and a second hook 2740. First hook 2738 and second hook 2740 are bent so they are angled relative to support base body 2706. First hook 2738 is through hole 108b and second hook 2740 is through hole 108c. First hook 2738 and second hook 2740 can each have a protuberance 2742 so that first hook 2738 is larger in size than hole 108b and second hook 2740 is larger in size than hole 108c to maintain first hook 2738 in hole 108b and second hook 2740 in hole 108c that also maintains the connection between support 2700 and box body 102.

Figure 34:
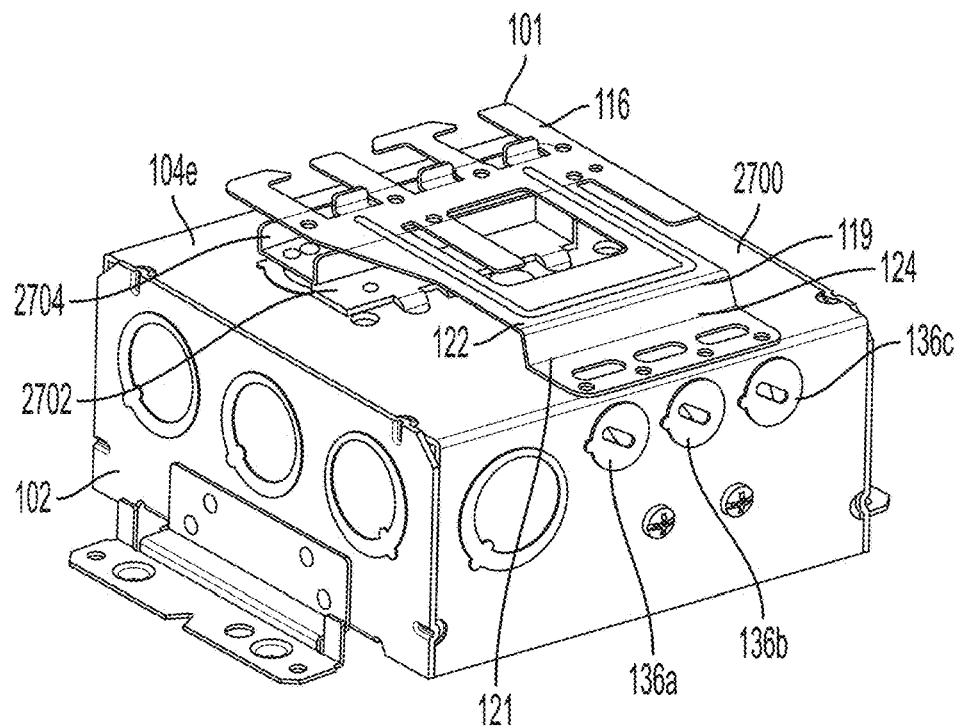
FIG. 34 is a top perspective view of the electrical box assembly of FIG. 27 in a shipped position.
Figure 35:
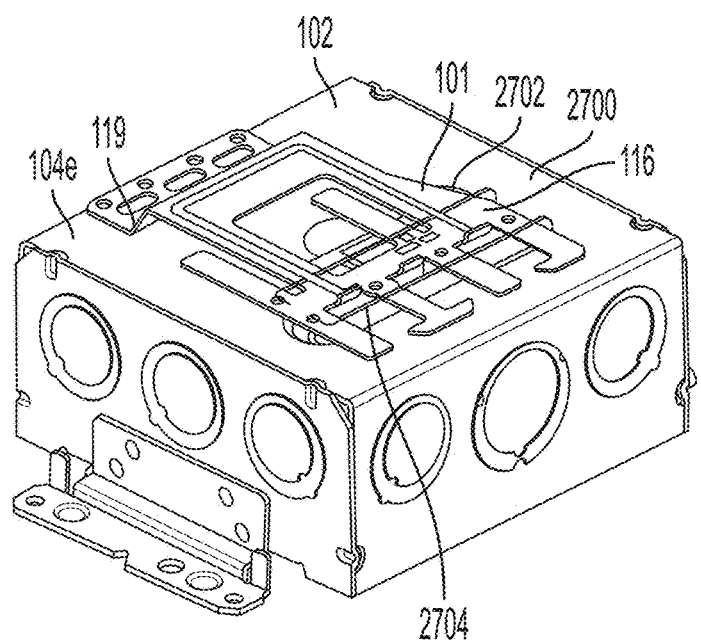
FIG. 35 is a bottom perspective view of FIG. 34.

Referring to FIGS. 34-35, electrical box assembly 2700, cable support bracket 101, support base 2702 and support base extension 2704 can be manufactured in a shipped position. The shipped position minimizes damage to electrical box assembly 2700, cable support bracket 101, support base 2702 and support base extension 2704 prior to installation, and, in particular, during shipping.

Figure 36:
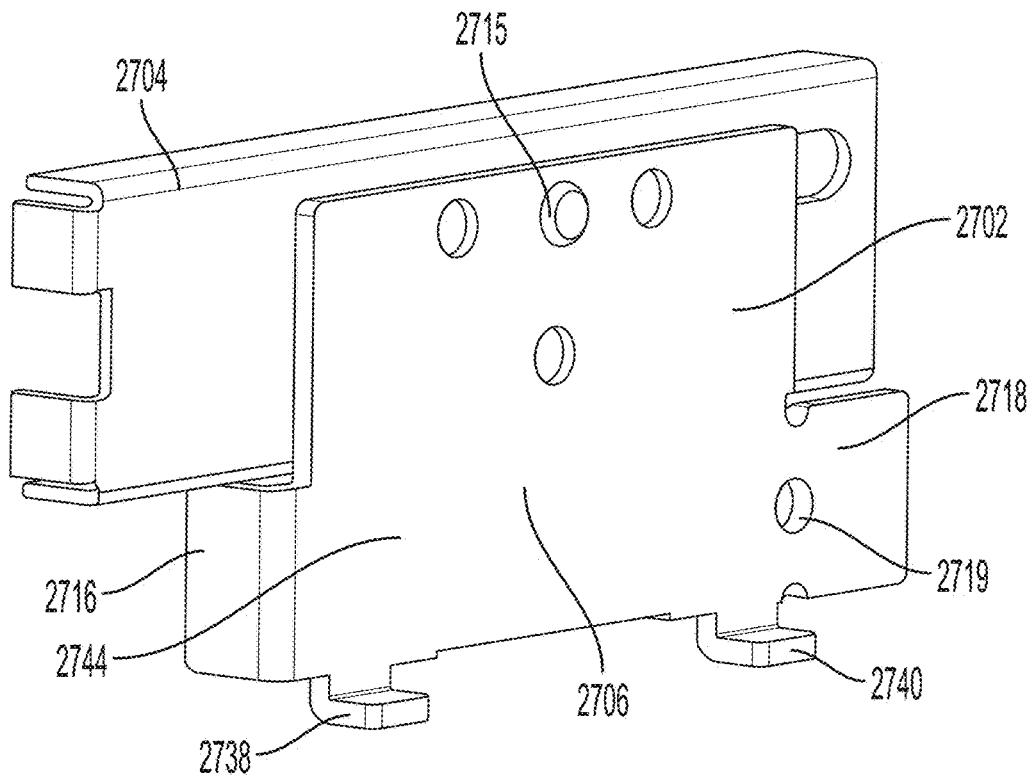
FIG. 36 is a bottom perspective view of the support base and the support base extension of FIG. 27 in a shipped configuration.
Figure 37:
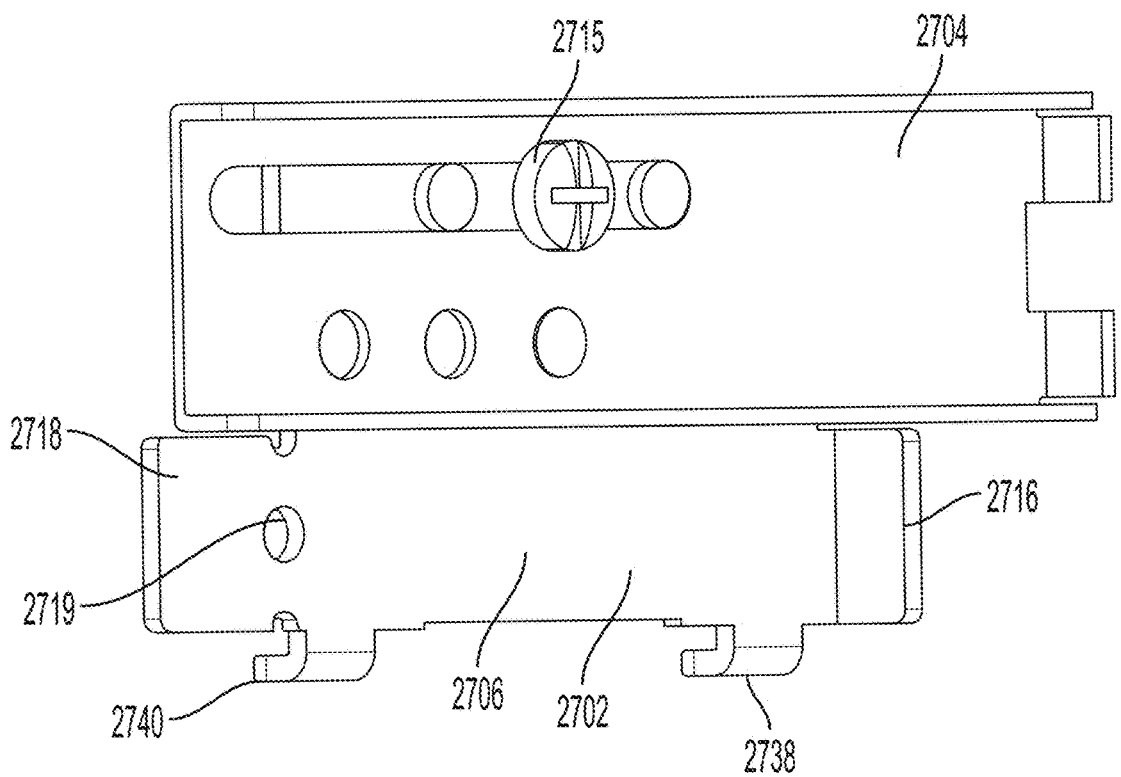
FIG. 37 is a top perspective view of FIG. 36.

Referring to FIGS. 36-37, support base 2702 has a shipped configuration where second side projection 2718 is unbent. Support base body 2706 has hole 2719 at second side projection 2718. The shipped configuration of support base 2702 allows second side projection 2718 to be flat adjacent box body 102 in the shipped position of electrical box assembly 2700 and support base 2702. Support base 2702 is connected to support base extension 2704 in the first installed position when in the shipped position.

Figure 41:
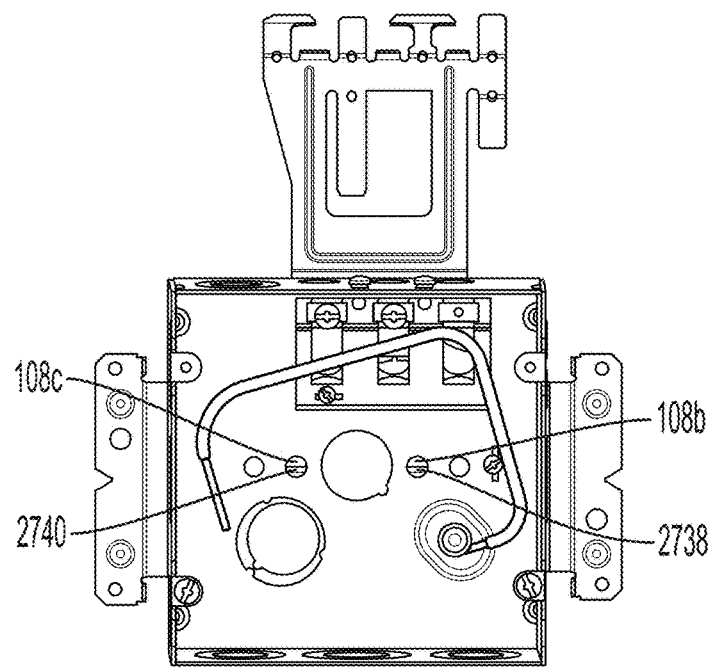
FIG. 41 is a front view of FIG. 38.

In the shipping position, support base 2702 has a side 2744, as shown in FIG. 36, that is placed adjacent side 104e of box body 102 so that first hook 2738 is though hole 108b and second hook 2740 is through hole 108c as shown in FIG. 41. In the shipping position, cable support bracket 101 also helps to retain first hook 2738 and second hook 2740 in holes 108b and 108c. Referring back to FIG. 34, connection section 119 of cable support bracket 101 extends away from box body 102 to space support portion 116 away from box body 102 above support base 2702 and support base extension 2704 so that a surface 126, as shown in FIG. 10, is adjacent support base 2702 and support base extension 2704 in the shipped configuration.

Figure 38:
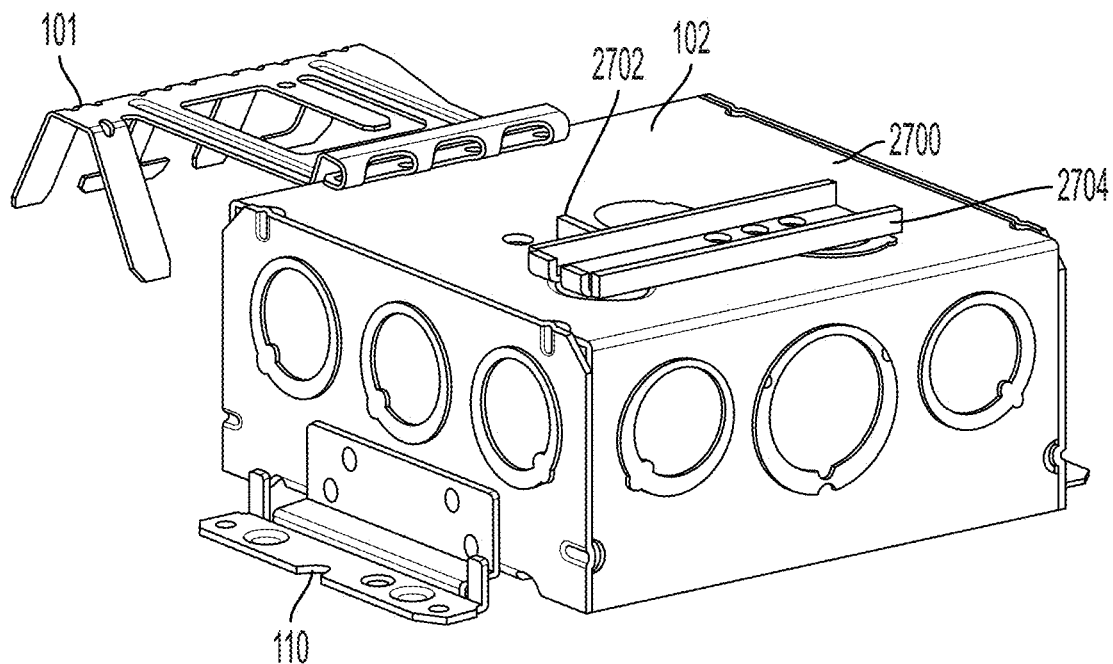
FIG. 38 is a bottom perspective view of the second embodiment of the electrical box assembly having the support base and the support base extension in a second installed position.
Figure 39:
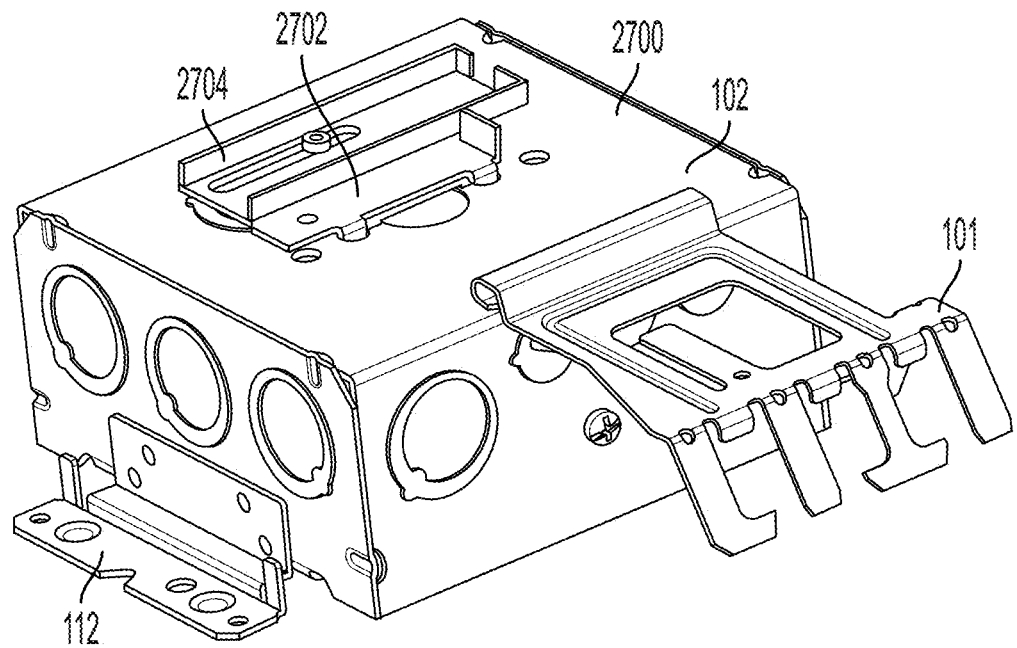
FIG. 39 is a top perspective view of FIG. 38.
Figure 40:
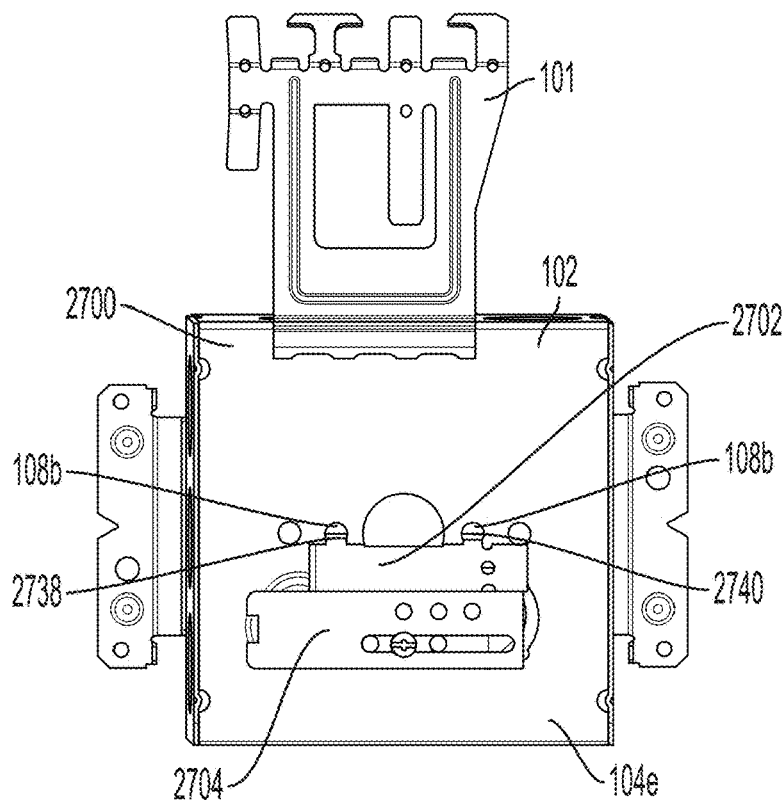
FIG. 40 is a rear view of FIG. 38.

Still referring to FIGS. 34-35, to install electrical box assembly 2700, cable support bracket 101, support base 2702 and support base extension 2704 that are in the shipped position on to a stud, a user moves support portion 116 away from box body 102 so that connection section 119 rotates along fold line 124 over contact section 121 and support portion 116 rotates along fold line 122 from the shipped position to the installed position as shown in FIG. 28. Support base body 2706 is then moved away from box body 102 from the shipped configuration, as shown in FIG. 38, to the first installed position, as shown in FIG. 28, when installing on a 3.625 inch stud; however, support can alternatively be in the second, third, fourth, fifth or sixth installed positions as described herein depending on the size of the stud. When support base body 2706 is moved from the shipped configuration to the first installed position, first hook 2738 and second hook 2740 move from the position as shown in FIG. 41 to the position in FIG. 29. Referring to FIG. 36, second side projection 2718 is then bent along hole 2719 so that support base 2702 is in the first installed position as shown in FIG. 28 also positioning support base extension 2704 in the first installed position. Second side projection 2718 limits movement in a direction away from cable support bracket 101 and first side projection 2716 limits movement toward cable support bracket 101 to maintain support base 2702 in the first installed position. First bracket 110 and/or second bracket 112 can then be connected to a stud that will be positioned between the front drywall panel and the rear drywall panel of the wall. Support ridge 2722 of support base extension 2704 in the first installed position rests against the rear drywall panel when first bracket 112 and/or second bracket are connected to the stud to support electrical box assembly 2700 in the installed position. The folded configuration of ridge 2722 minimizes damage to the rear drywall panel. Cables can then be installed for electrical box assembly 2700 as discussed above for electrical box assembly 100.

Advantageously, the configuration of support base 2702 and support base extension 2704 allows use of material that is more robust than typical supports given the shape of support base 2702 and support base extension 2704. The shipped position allows electrical box assembly 2700, cable support bracket 101, support base 2702 and support base extension 2704 to be prefabricated in the shipped position to minimize damage prior to installation.

Referring to FIGS. 38-41, electrical box assembly 2700, support base 2702 and support base extension 2704 are shown in a second installed position instead of the first installed position. The second installed position is the same as the first installed position of FIGS. 27-37 except when moving from the shipped position to the second installed position, support base 2702 and support base extension 2704 stay in the shipped configuration. For example, a user can use support base 2702 and support base extension 2704 in the second installed position instead of the first installed position when the stud is narrower than when using the first installed position such as a 2.5 inch stud. When installed on the 2.5 inch stud, support base 2702 and support base extension 2704 will rests against the rear drywall panel in the second installed position when first bracket 110 and/or second bracket 112 are connected to the stud to support electrical box assembly 2700.

Figure 42:
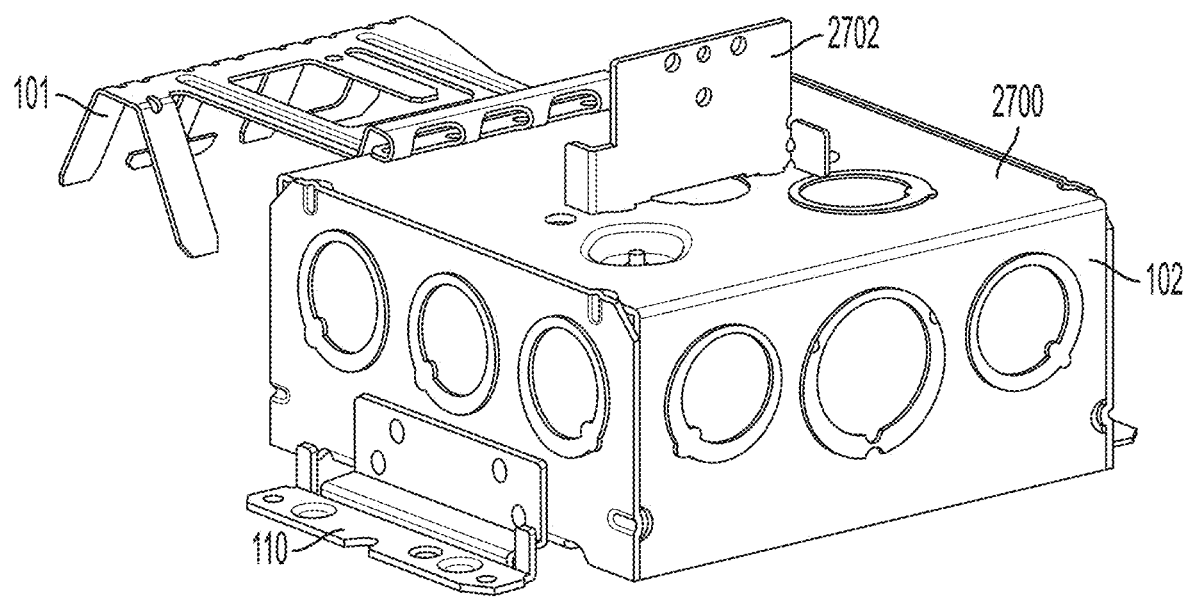
FIG. 42 is a bottom perspective view of the second embodiment of the electrical box assembly having the support base and the support base extension in a third installed position.
Figure 43:
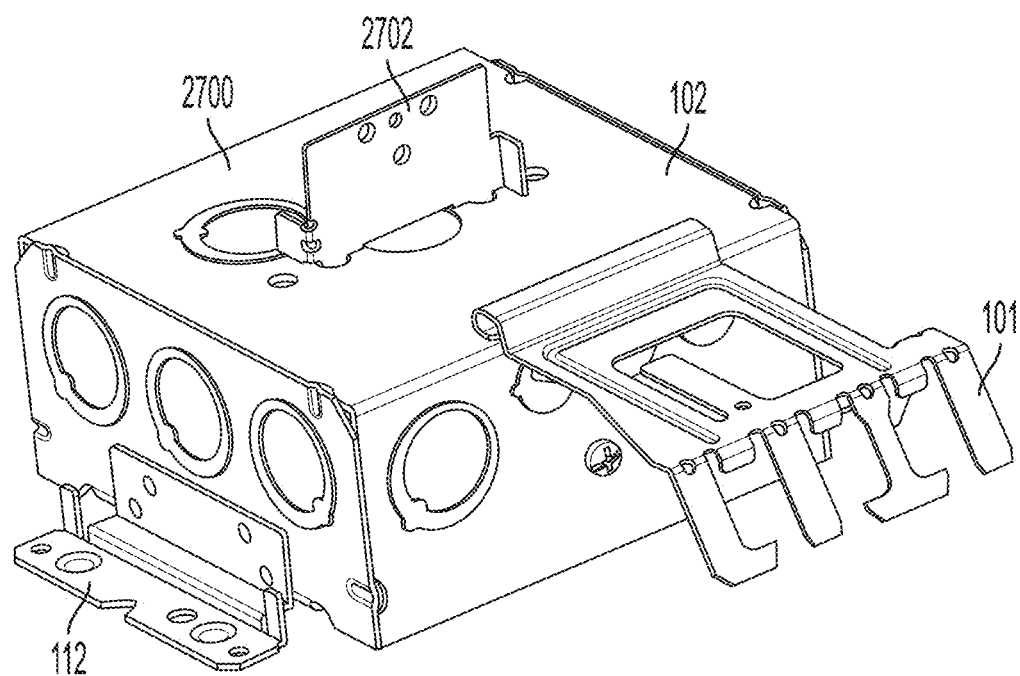
FIG. 43 is a top perspective view of FIG. 42.

Referring to FIGS. 42-43, electrical box assembly 2700, support base 2702 and support base extension 2704 are show in a third installed position instead of the first installed position. The third installed position is the same as the first installed position of FIGS. 27-37 except support base extension 2704 is removed. For example, a user can move support base 2702 and support base extension 2704 into the third installed position instead of the first installed position and remove support base extension 2704 when the stud is narrower than when using the first installed position such as a 3.5 inch stud. When installed on the 3.5 inch stud, support base 2702 will rest against the rear drywall panel in the third installed position when first bracket 110 and/or second bracket 112 are connected to the stud to support electrical box assembly 2700.

Figure 44:
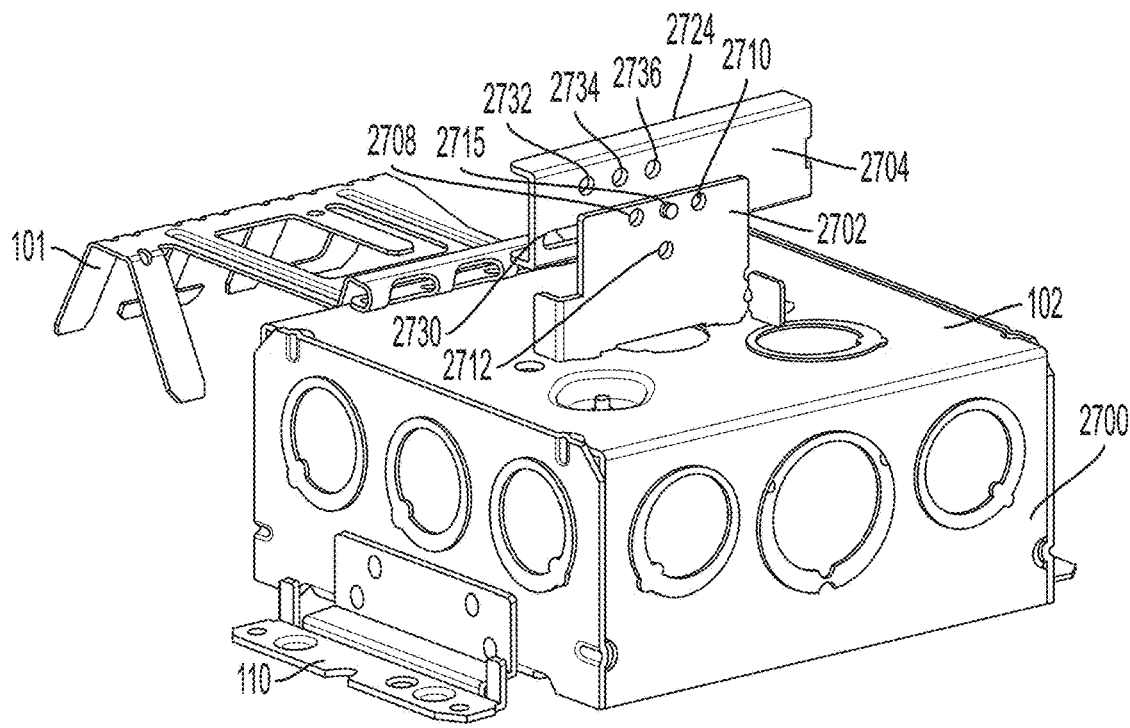
FIG. 44 is a bottom perspective view of the second embodiment of the electrical box assembly having the support base and the support base extension in a fourth installed position.
Figure 45:
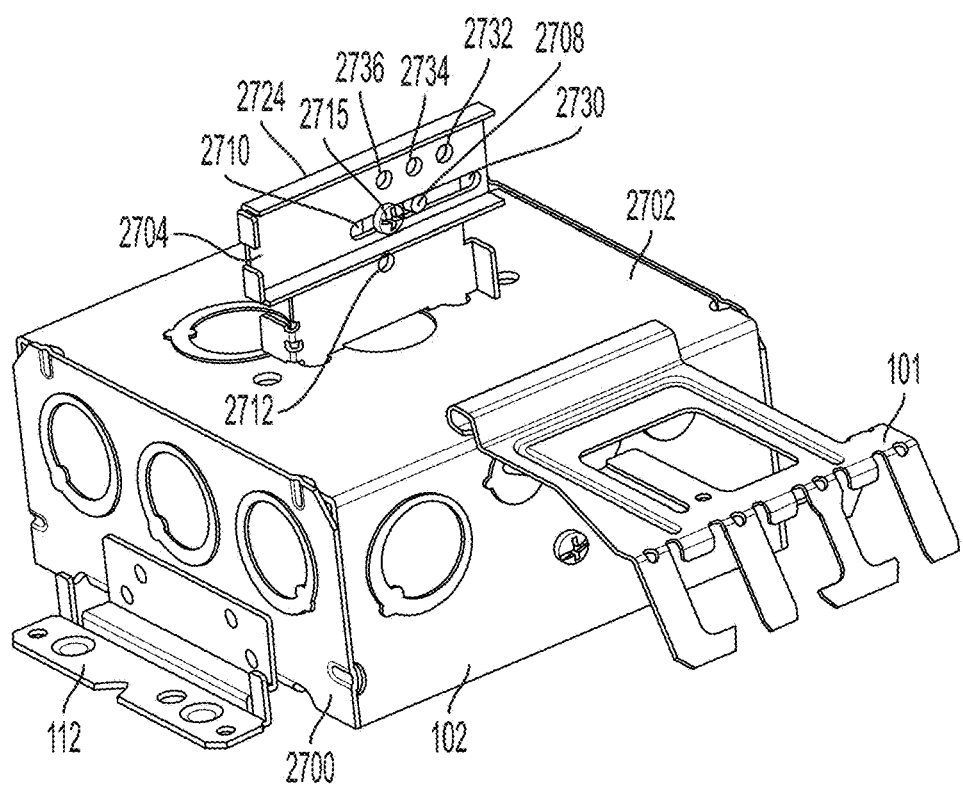
FIG. 45 is a top perspective view of FIG. 44.

Referring to FIGS. 44-45, electrical box assembly 2700, support base 2702 and support base extension 2704 are show in a fourth installed position instead of the first installed position. The fourth installed position is the same as the first installed position of FIGS. 27-37 except support base extension 2704 is connected in a different position on support base 2702. To connect support base 2702 and support base extension 2704 in the fourth installed position, support base extension 2704 is rotated 180 degrees from the first installed position so that protuberances 2708, 2710 of support base 2702 are through elongated opening 2730 of support base extension 2704 and holes 2732, 2734, 2736 are on a portion of support base extension 2704 that extends beyond support base 2702. Fastener 2715, for example, a screw, passes through elongated opening 2730 of support base extension 2704 and opening 2714 of support base 2702 to secure support base 2702 and support base extension 2704 together in the fourth installed position. For example, a user can move support base 2702 and support base extension 2704 into the fourth installed position instead of the first installed position when the stud is wider than when using the first installed position such as a 4 inch stud. When installed on the 4 inch stud, support ridge 2724 will rest against the rear drywall panel in the fourth installed position when first bracket 110 and/or second bracket 112 are connected to the stud to support electrical box assembly 2700.

Figure 46:
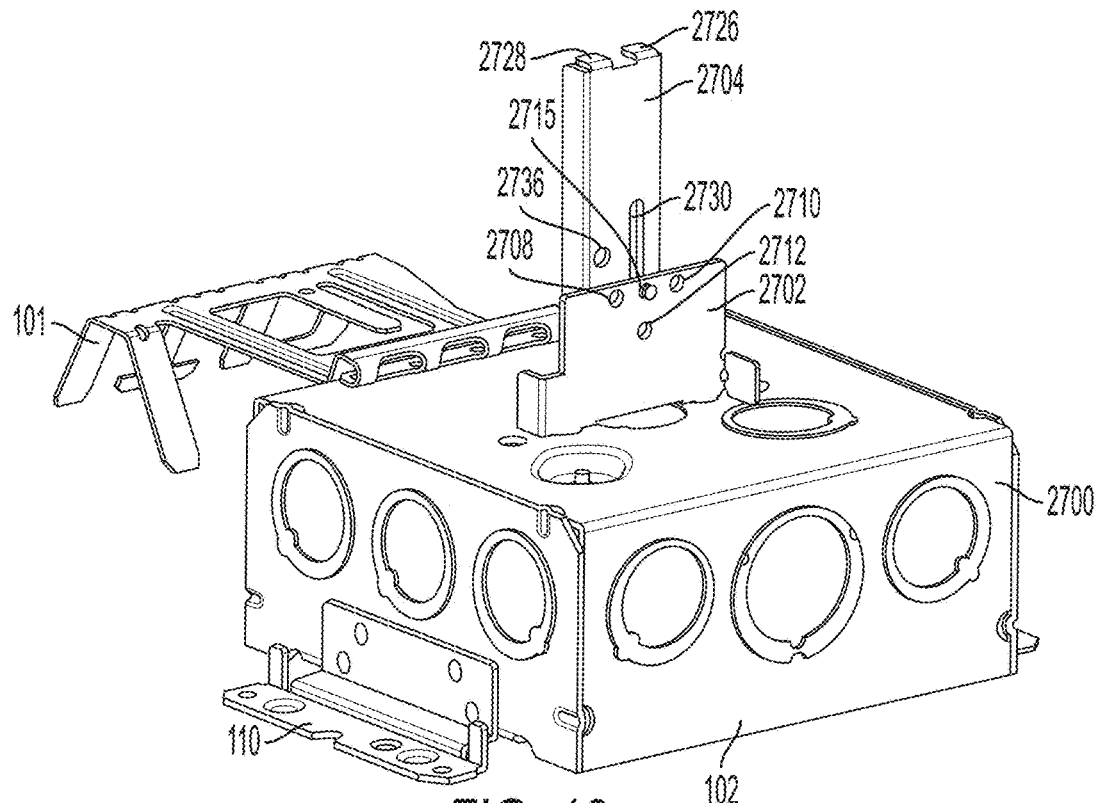
FIG. 46 is a bottom perspective view of the second embodiment of the electrical box assembly having the support base and the support base extension in a fifth installed position.
Figure 47:
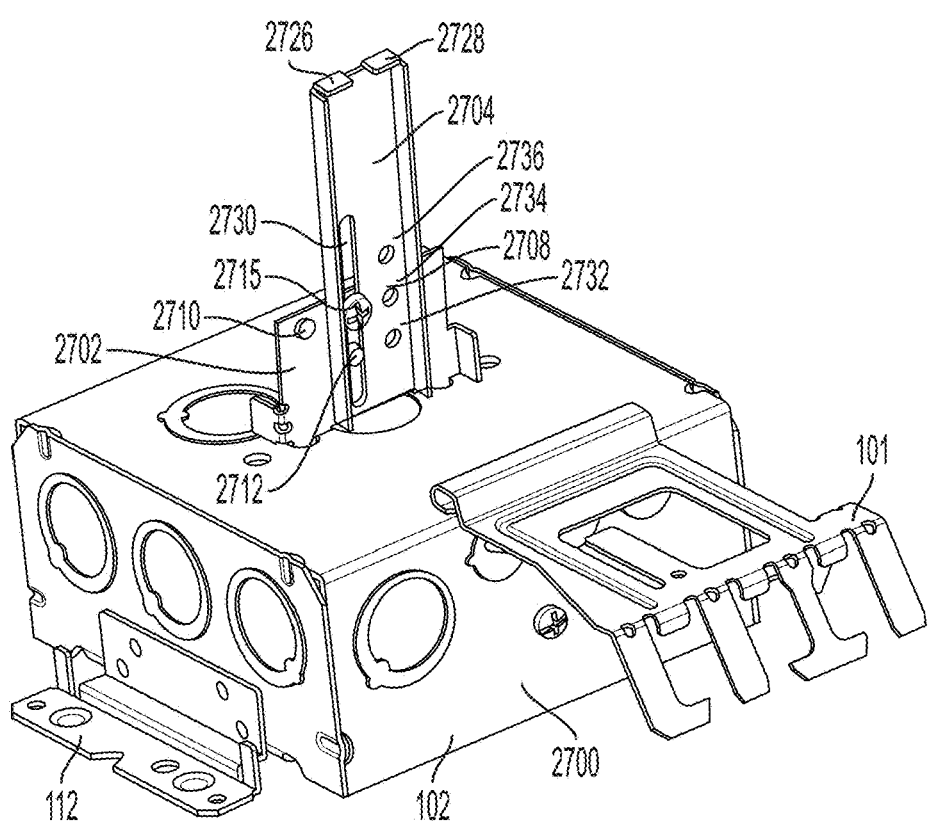
FIG. 47 is a top perspective view of FIG. 46.

Referring to FIGS. 46-47, electrical box assembly 2700, support base 2702 and support base extension 2704 are show in a fifth installed position instead of the first installed position. The fifth installed position is the same as the first installed position of FIGS. 27-37 except support base extension 2704 is connected in a different position on support base 2702. To connect support base 2702 and support base extension 2704 in the fifth installed position, support base extension 2704 is rotated from the first installed position so that protuberance 2708 of support base 2702 is through hole 2734 of support base extension 2704 and protuberance 2712 of support base 2702 is through elongated opening 2730 of support base extension 2704. Fastener 2715, for example, a screw, passes through elongated opening 2730 of support base extension 2704 and opening 2714 of support base 2702 to secure support base 2702 and support base extension 2704 together in the fifth installed position. A user can move support base 2702 and support base extension 2704 into the fifth installed position instead of the first installed position when the stud is wider than when using the first installed position, for example, the stud is a 5.5 inch stud. When installed on the 5.5 inch stud, tab members 2726, 2728 rest against the rear drywall panel in the fifth installed position when first bracket 112 and/or second bracket are connected to the stud to support electrical box assembly 2700.

Figure 48:
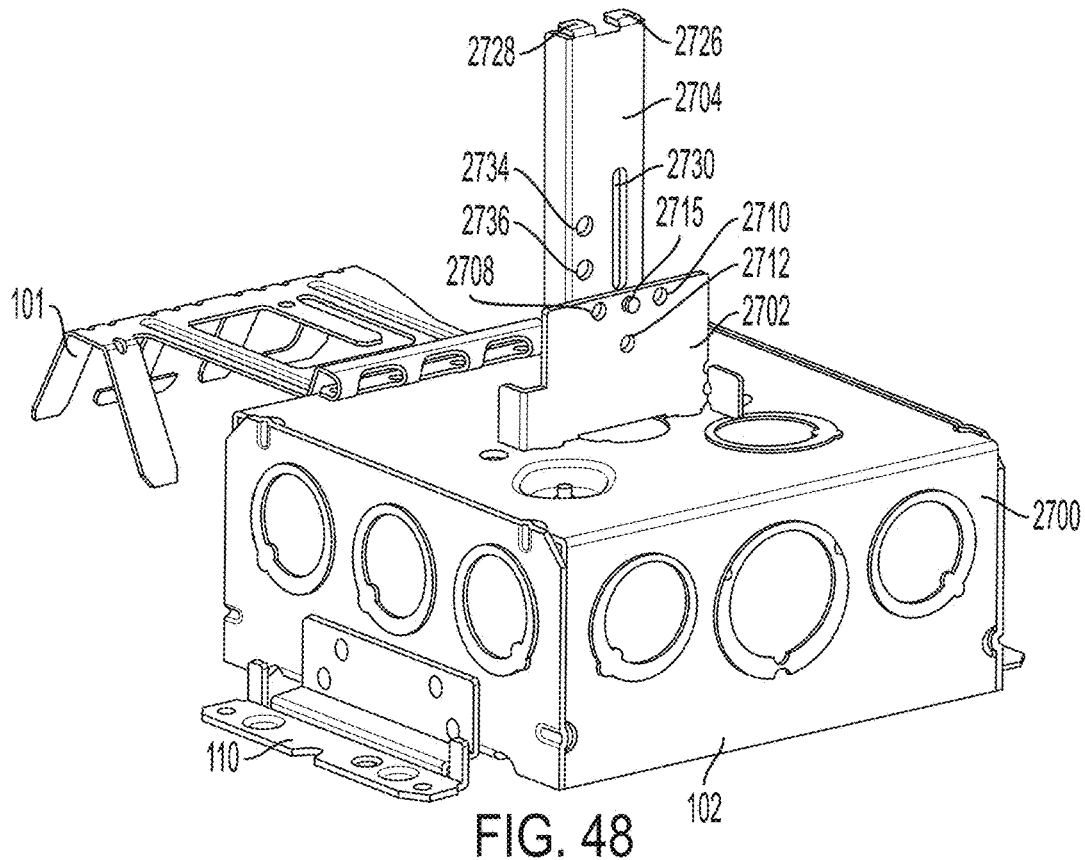
FIG. 48 is a bottom perspective view of the second embodiment of the electrical box assembly having the support base and the support base extension in a sixth installed position.
Figure 49:
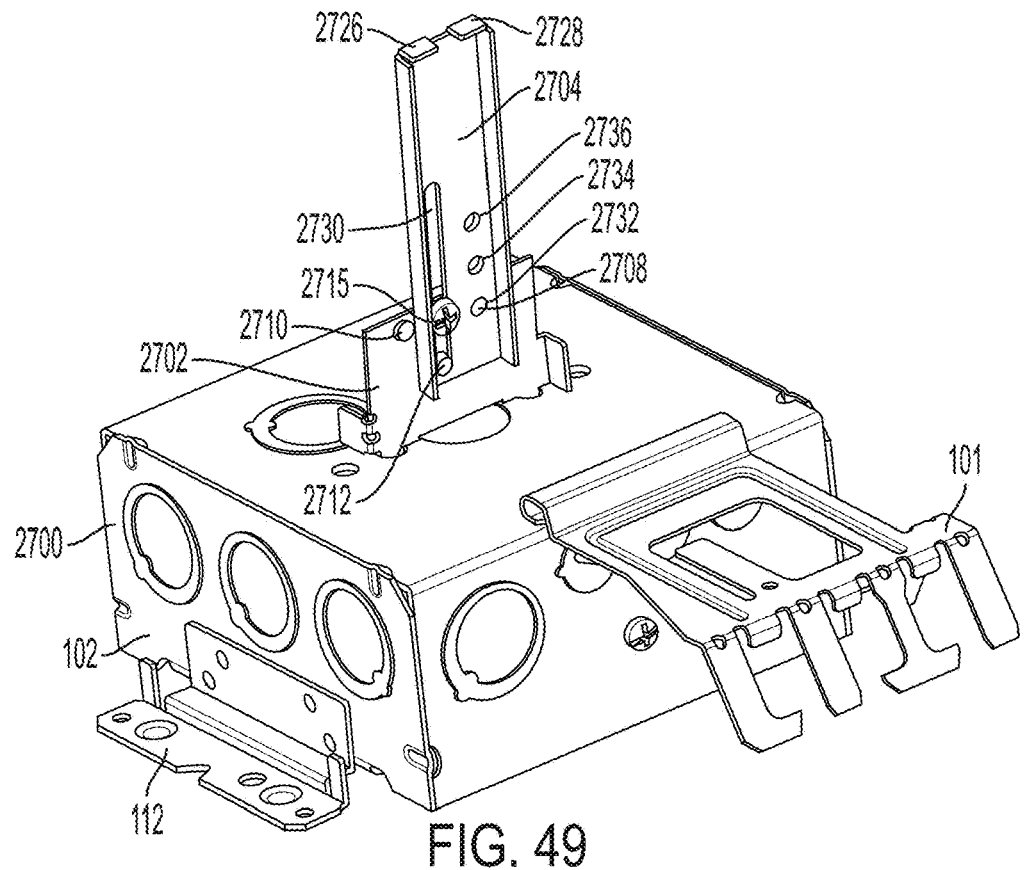
FIG. 49 is a top perspective view of FIG. 48.

Referring to FIGS. 48-49, electrical box assembly 2700, support base 2702 and support base extension 2704 are show in a sixth installed position instead of the first installed position. The sixth installed position is the same as the first installed position of FIGS. 27-37 except support base extension 2704 is connected in a different position on support base 2702. To connect support base 2702 and support base extension 2704 in the sixth installed position, support base extension 2704 is rotated from the first installed position so that protuberance 2708 of support base 2702 is through hole 2732 of support base extension 2704 and protuberance 2712 of support base 2702 is through elongated opening 2730 of support base extension 2704. Fastener 2715, for example, a screw, passes through elongated opening 2730 of support base extension 2704 and opening 2714 of support base 2702 to secure support base 2702 and support base extension 2704 together in the sixth installed position. A user can move support 10 into the sixth installed position instead of the first installed position when the stud is wider than when using the first installed position, for example, the stud is a 6 inch stud. When installed on the 6 inch stud, tab members 2726, 2728 rest against the rear drywall panel in the sixth installed position when first bracket 112 and/or second bracket are connected to the stud to support electrical box assembly 2700.

Support base 2702 and support base extension 2704 are a material that allows bending while still being a robust material. Support base 2702 and support base extension 2704 are, for example, galvanized steel that is greater than 0.051 inch, and, can be 0.062 inch galvanized steel.

Accordingly, support base 2702 and support base extension 2704 can be adjusted to different installed positions, namely, the first installed position of FIGS. 27-37, the second installed position of FIGS. 38-41, the third installed position of FIGS. 42-43, the fourth installed position of FIGS. 44-45, the fifth installed position of FIGS. 46-47 and the sixth installed position of FIGS. 48-49, so that support base 2702 and support base extension 2704 accommodate various stud depths. Accordingly, support base 2702 and support base extension 2704 eliminate extra box mounting brackets, by incorporating a universal stabilizer into electrical box assembly 2700. Support base 2702 and support base extension 2704 are a plate that includes feet, namely, first hook 2738 and second hook 2740, designed to engage with a NEMA hole pattern in box body 102, and is supplied flat to the back of box body 102 to save shipping space. Support base 2702 is a plate that is hinged 90 degrees and second side projection 2718 is bent 90 degrees to lock support base 2702 in position. No other alterations are required for 3⅝ inch studs.

Figure 50:
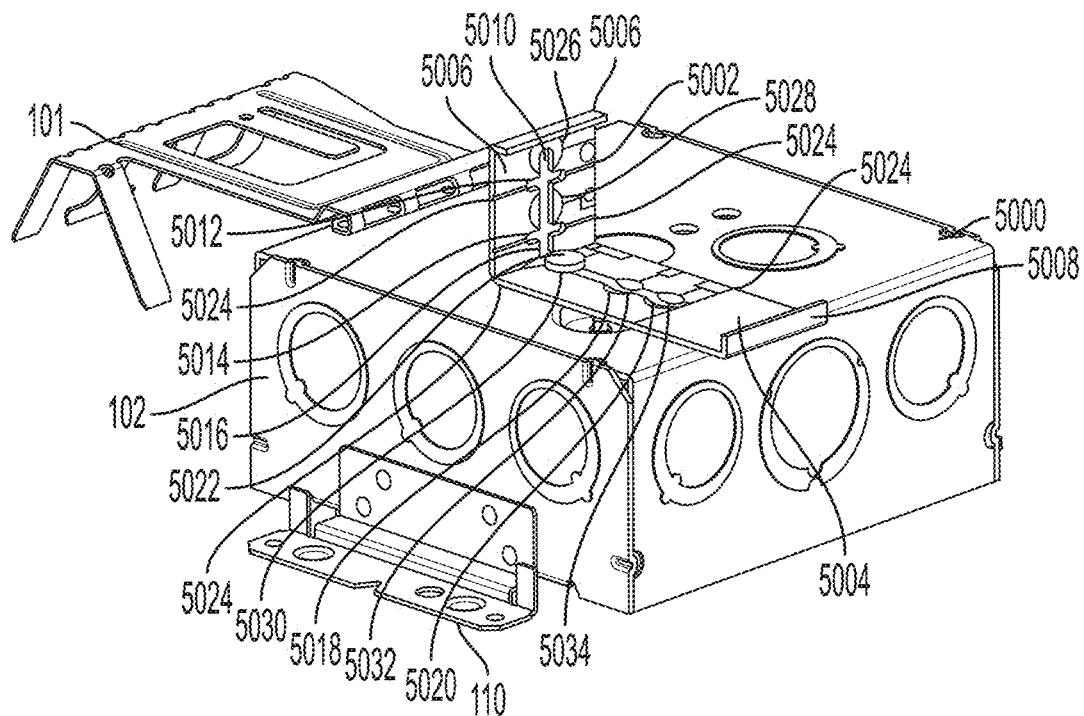
FIG. 50 is a bottom perspective view of an exemplary embodiment of a third embodiment of an electrical box assembly having a support member according to the present disclosure in a first installed position.
Figure 51:
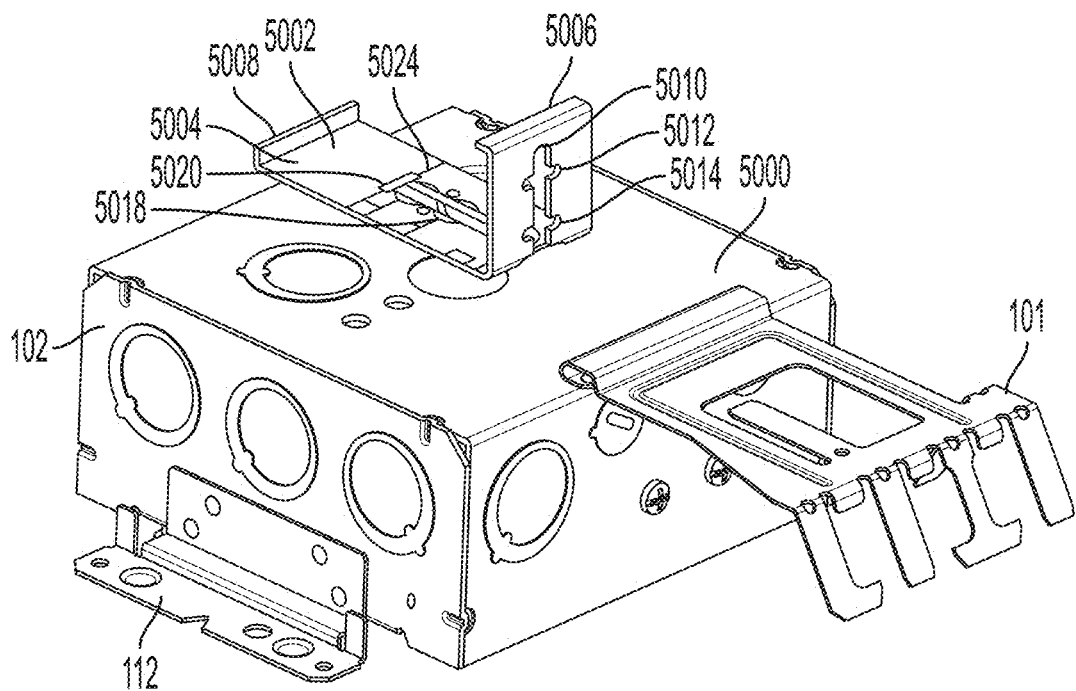
FIG. 51 is a top perspective view of FIG. 50.
Figure 52:
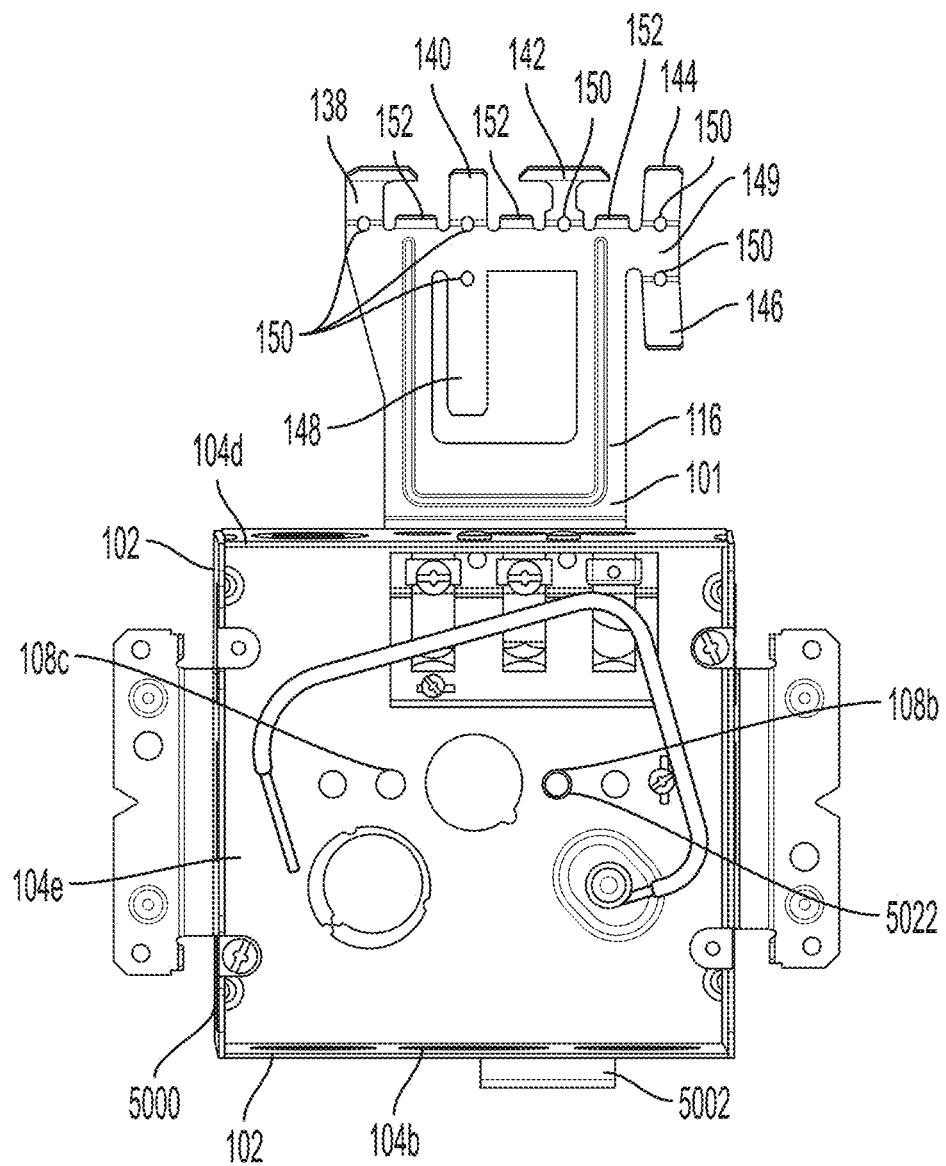
FIG. 52 is a front view of FIG. 50.

Referring to FIGS. 50-51, a third embodiment of an electrical box assembly according to the present disclosure is shown and is generally referred to by reference numeral 5000. Electrical box assembly 5000 is the same as box assembly 100 except has a support member 5002 instead of support 10 and support extension 2100. Accordingly, features that are the same for electrical box assembly 5000 and electrical box assembly 100 have the same reference numerals.

Figure 53:
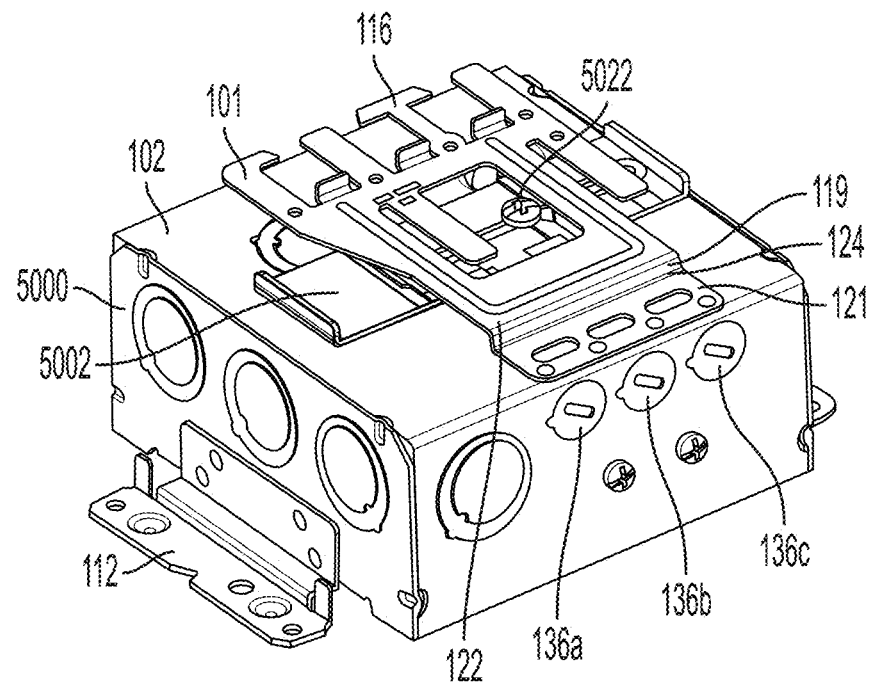
FIG. 53 is a top perspective view of the third embodiment of the electrical box assembly of FIG. 50 in a shipped position.

Support member 5002 is shown in the first installed position of six installed positions on electrical box assembly 5000 for a first stud depth, for example, a stud depth of 3.625 inches. Support base 5002 has support member body 5004. Support member body 5004 has a first fold 5006 along a first end of support member body 5004 and a second fold 5008 along a second end of support member body 5004. Support member 5002 has a length in a direction extending from first fold 5006 to second fold 5008 and a width in a direction extending along the first and second ends of support member body 5004. Support member 5002 has an elongated opening 5010 extending in the length direction. Support member 5002 has a first slot 5012, second slot 5014, a third slot 5016, a fourth slot 5018 and a fifth slot 5020 through support member body 5004 that each extend in the width direction and intersect with elongated opening 5010 at a different location along the length direction. Support member 5002 has line depressions 5024 on opposite sides of each of first slot 5012, second slot 5014, third slot 5016, and fifth slot 5020. Support member 5002 is connected to box body 102 by a fastener 5022 that passes through elongated opening 5010 and hole 108b through box body 102 as shown in FIG. 53. Support member 5002 has a first indicia 5026, a second indicia 5028, a third indicia 5030, a fourth indicia 5032 and a fifth indicia 5034. Each of first indicia 5026, second indicia 5028, third indicia 5030, fourth indicia 5032 and fifth indicia 5034 indicates a location to place fastener 5022 on support member 5002 by circular indicia and a size of a stud, for example, a metal or wood stud. First indicia 5026 is between first slot 5012 and fold 5006 that indicates a location to place fastener 5022 for a 6 inch stud. Second indicia 5028 is between first slot 5012 and second slot 5014 that indicates a location to place fastener 5022 for a 5.5 inch stud. Third indicia 5030 is adjacent third slot 5016 between third slot 5016 and fourth slot 5018 that indicates a location to place fastener 5022 for a 3.625 inch stud. Fourth indicia 5032 is adjacent fourth slot 5018 between third slot 5016 and fourth slot 5018 that indicates a location to place fastener 5022 for a 4 inch stud. Fifth indicia 5034 is adjacent fourth slot 5018 between fourth slot 5018 and fifth slot 5020 that indicates a location to place fastener 5022 for a 3.5 inch stud.

Referring to FIG. 50, fastener 5022 is placed through elongated opening 5010 at third indicia 5030 and hole 108b through box body 102 in the first installed position. A side of support member body 5004 including fold 5006 is also bent at third slot 5016 along depression 5024 away from box body 102 in the first installed position.

Figure 54:
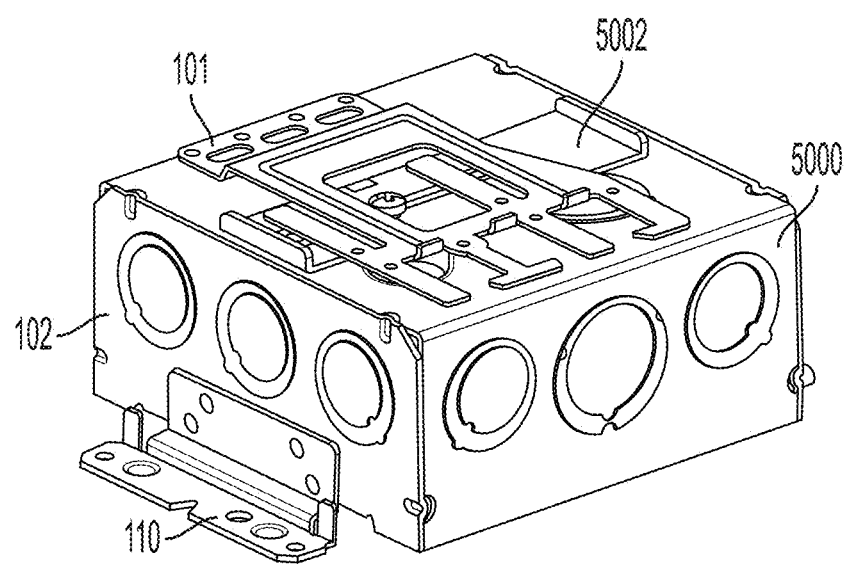
FIG. 54 is a bottom perspective view of FIG. 53.

Referring to FIGS. 53-54, electrical box assembly 5000, cable support bracket 101 and support member 5002 can be manufactured in a shipped position. The shipped position minimizes damage to electrical box assembly 5000, cable support bracket 101 and support member 5002 prior to installation, and, in particular, during shipping.

Support member 5002 has a shipped configuration where support member body 5004 is unbent. In the shipping position, connection section 119 of cable support bracket 101 extends away from box body 102 to space support portion 116 away from box body 102 above support member 5002 so that a surface 126, as shown in FIG. 10, is adjacent support member 5002 in the shipped configuration.

Figure 55:
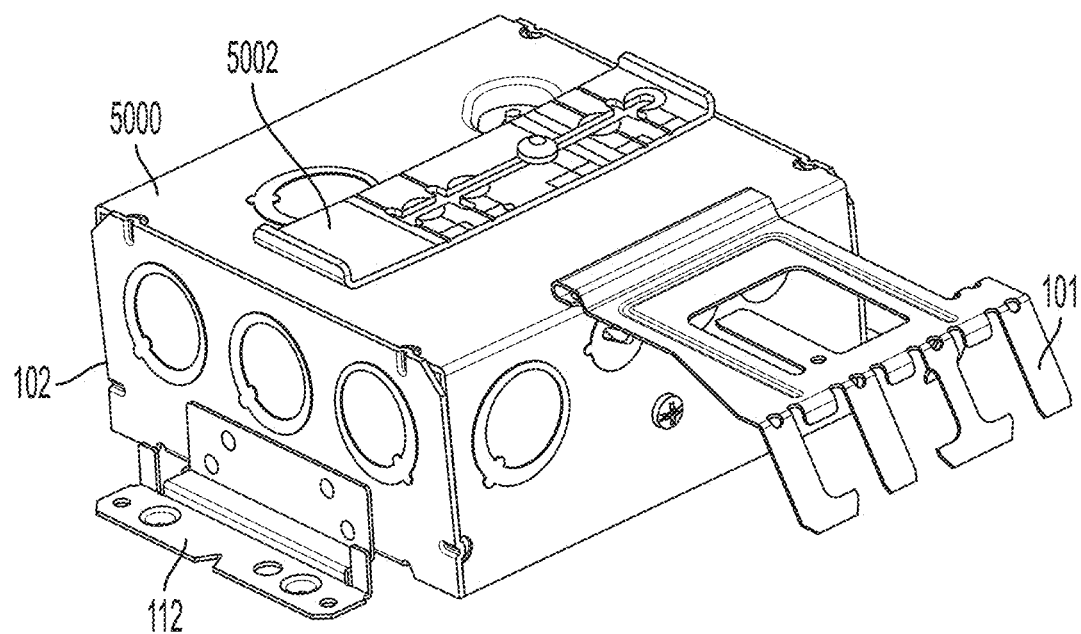
FIG. 55 is a top perspective view of the third embodiment of the electrical box assembly having the support member in a second installed position.

Still referring to FIGS. 53-54, to install electrical box assembly 5000, cable support bracket 101, and support member 5002 that are in the shipped position on to stud, a user moves support portion 116 away from box body 102 so that connection section 119 rotates along fold line 124 over contact section 121 and support portion 116 rotates along fold line 122 from the shipped position, as shown in FIG. 53, to the installed position as shown in FIG. 50. The side of support member body 5004 that includes fold 5006 is also bent at third slot 5016 along depression 5024 away from box body 102 from the shipped configuration, as shown in FIG. 55, to the first installed position, as shown in FIG. 50, when installing on a 3.625 inch stud; however, support can alternatively be in the second, third, fourth, fifth or sixth installed positions as described herein depending on the size of the stud. Fastener 5022 maintains support member 5002 in position at third indicia 5030 and a material of support member 5002 maintains the fold at third slot 5016. First bracket 110 and/or second bracket 112 can then be connected to a stud that will be positioned between the front drywall panel and the rear drywall panel of the wall. Fold 5006 of support member 5002 in the first installed position rests against the rear drywall panel when first bracket 112 and/or second bracket are connected to the stud to support electrical box assembly 5000 in the installed position. The folded configuration of fold 5006 minimizes damage to the rear drywall panel. Cables can then be installed for electrical box assembly 5000 as discussed above for electrical box assembly 100.

Advantageously, the configuration of support member 5002 allows use of material that is more robust than typical supports given the shape of support member 5002. The shipped position allows electrical box assembly 5000, cable support bracket 101 and support member 5002 to be prefabricated in the shipped position to minimize damage prior to installation, and to save shipping space.

Figure 56:
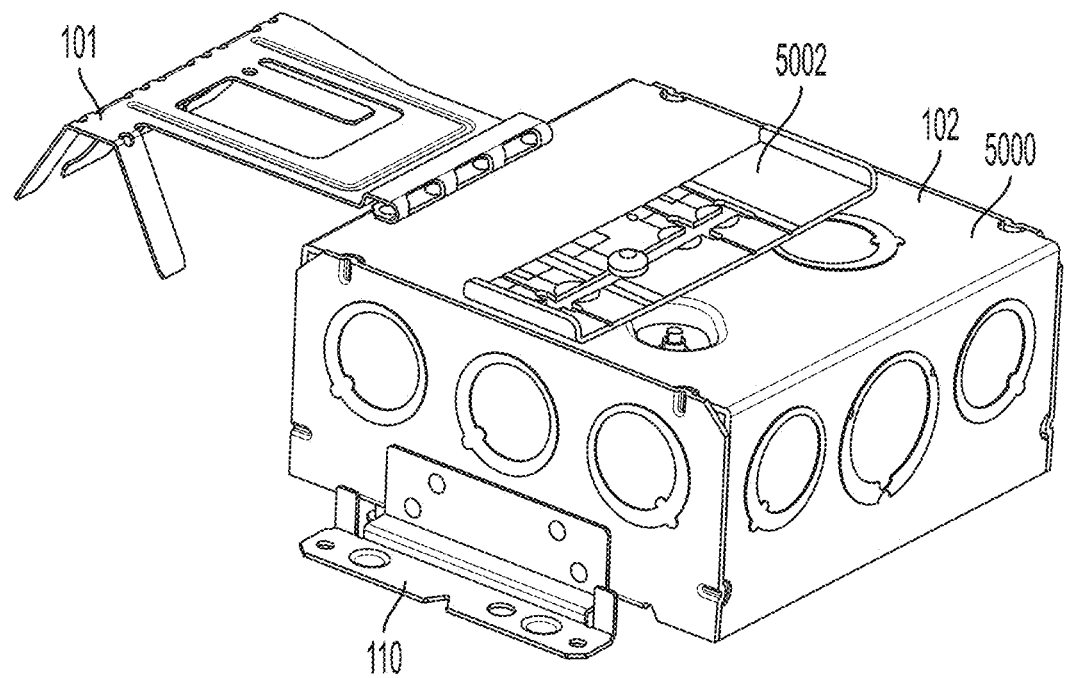
FIG. 56 is a bottom perspective view of FIG. 55.

Referring to FIGS. 55-56, electrical box assembly 5000, cable support bracket 101 and support member 5002 are shown in a second installed position instead of the first installed position. The second installed position is the same as the first installed position of FIGS. 50-54 except when moving from the shipped position to the second installed position, support member 5002 stays in the shipped configuration. For example, a user can use support member 5002 in the second installed position instead of the first installed position when the stud is narrower than when using the first installed position such as a 2.5 inch stud. When installed on the 2.5 inch stud, support member 5002 will rest against the rear drywall panel in the second installed position when first bracket 110 and/or second bracket 112 are connected to the stud to support electrical box assembly 5000.

Figure 57:
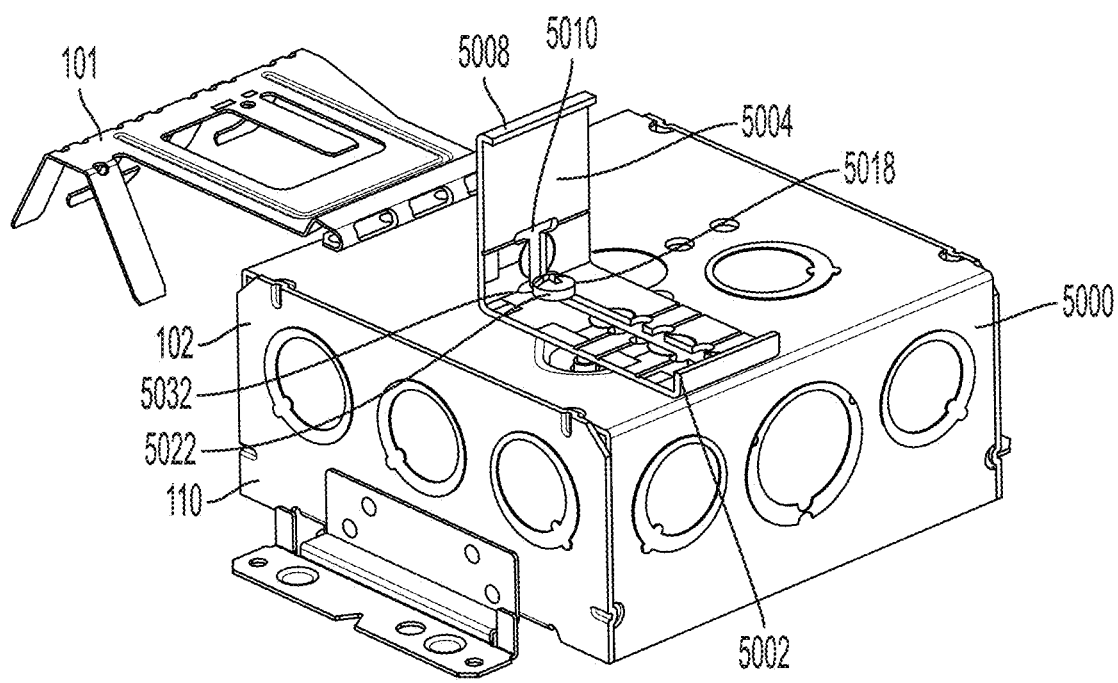
FIG. 57 is a bottom perspective view of the third embodiment of the electrical box assembly having the support member in a third installed position.
Figure 58:
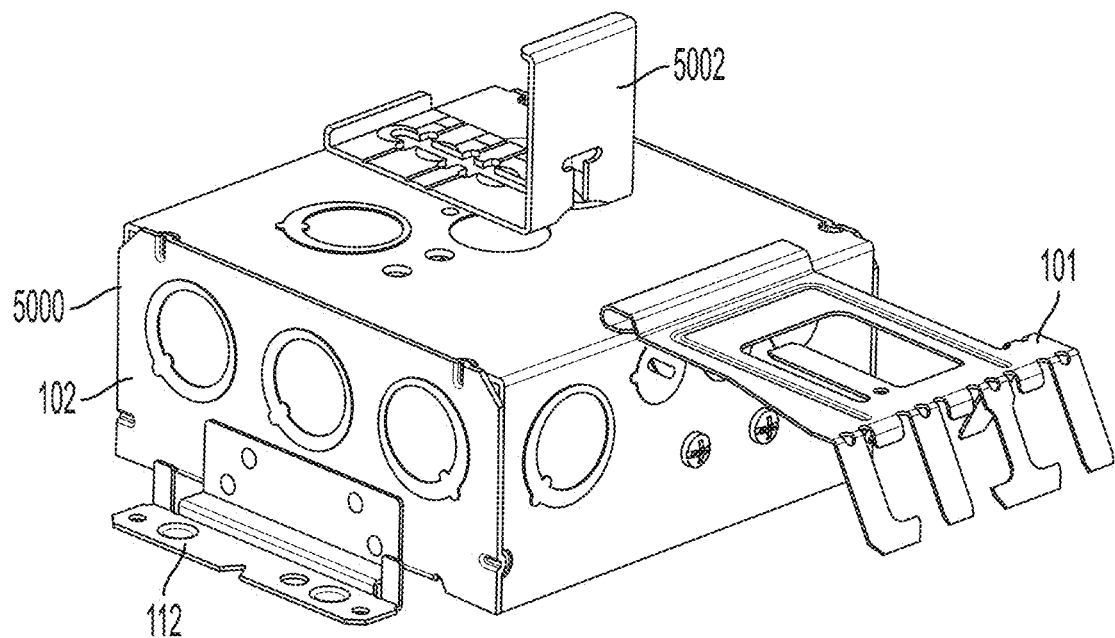
FIG. 58 is a top perspective view of FIG. 57.

Referring to FIGS. 57-58, electrical box assembly 5000, cable support bracket 101 and support member 5002 are show in a third installed position instead of the first installed position. The third installed position is the same as the first installed position of FIGS. 50-54 except support member 5002 is in a different position. To connect support member 5002 in the third installed position, fastener 5022 is moved to fourth indicia 5032 and inserted through elongated opening 5010 at fourth indicia 5032, and a side of support body 5004 that includes fold 5008 is bent at fourth slot 5018. For example, a user can move support member 5002 into the third installed position instead of the first installed position when the stud is wider than when using the first installed position such as a 4 inch stud. When installed on the 4 inch stud, fold 5008 will rest against the rear drywall panel in the third installed position when first bracket 110 and/or second bracket 112 are connected to the stud to support electrical box assembly 5000.

Figure 59:
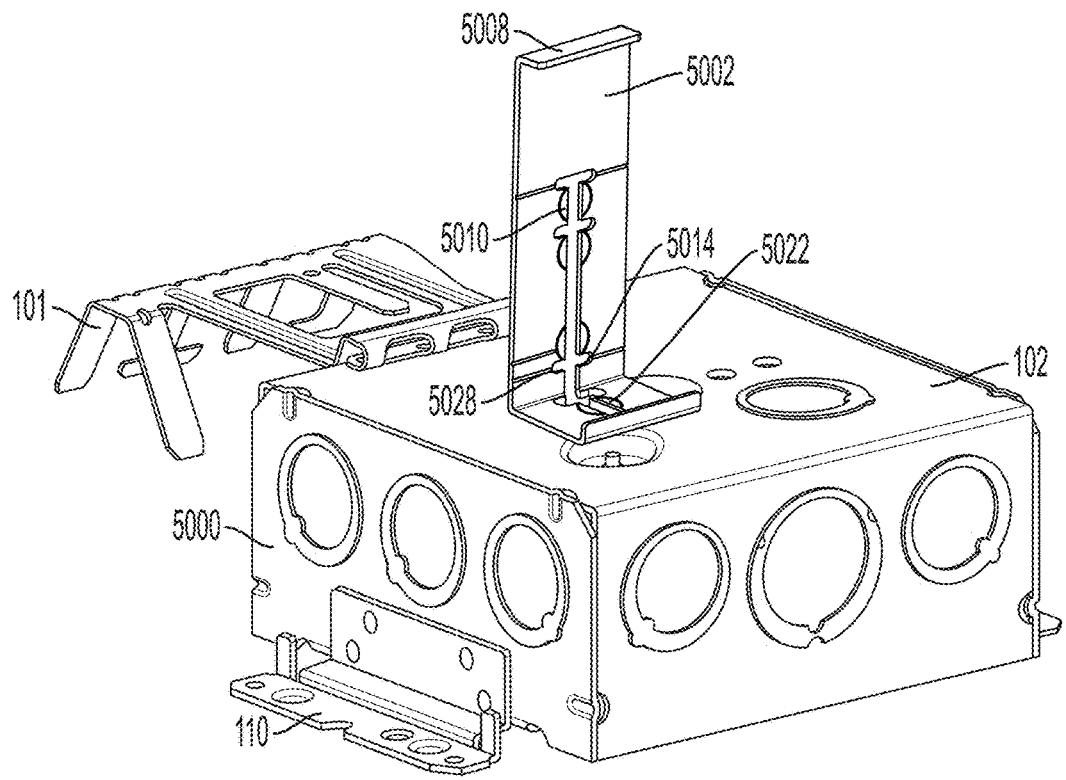
FIG. 59 is a bottom perspective view of the third embodiment of the electrical box assembly having the support member in a fourth installed position.
Figure 60:
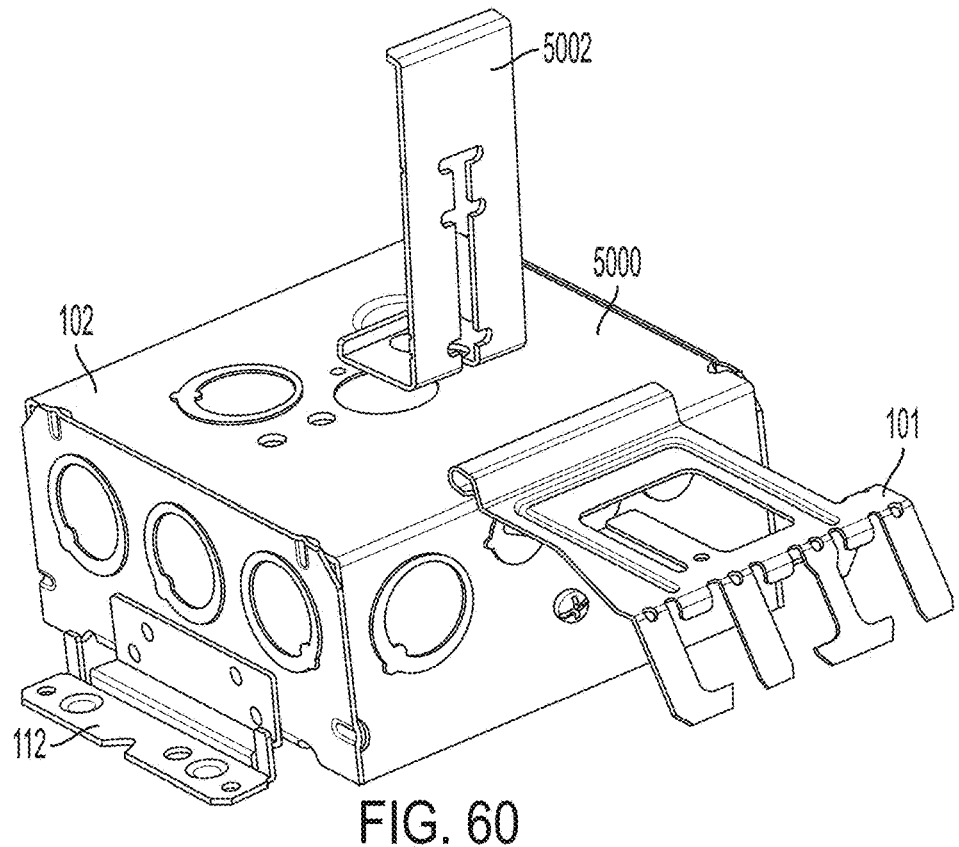
FIG. 60 is a top perspective view of FIG. 59.

Referring to FIGS. 59-60, electrical box assembly 5000, cable support bracket 101 and support member 5002 are show in a fourth installed position instead of the first installed position. The fourth installed position is the same as the first installed position of FIGS. 50-54 except support member 5002 is in a different position. To connect support member 5002 in the fourth installed position, fastener 5022 is moved to second indicia 5028 and inserted through elongated opening 5010 at second indicia 5028, and the side of support body 5004 that includes fold 5008 is bent at second slot 5014. For example, a user can move support member 5002 into the fourth installed position instead of the first installed position when the stud is wider than when using the first installed position such as a 5.5 inch stud. When installed on the 5.5 inch stud, fold 5008 will rest against the rear drywall panel in the fourth installed position when first bracket 110 and/or second bracket 112 are connected to the stud to support electrical box assembly 5000.

Figure 61:
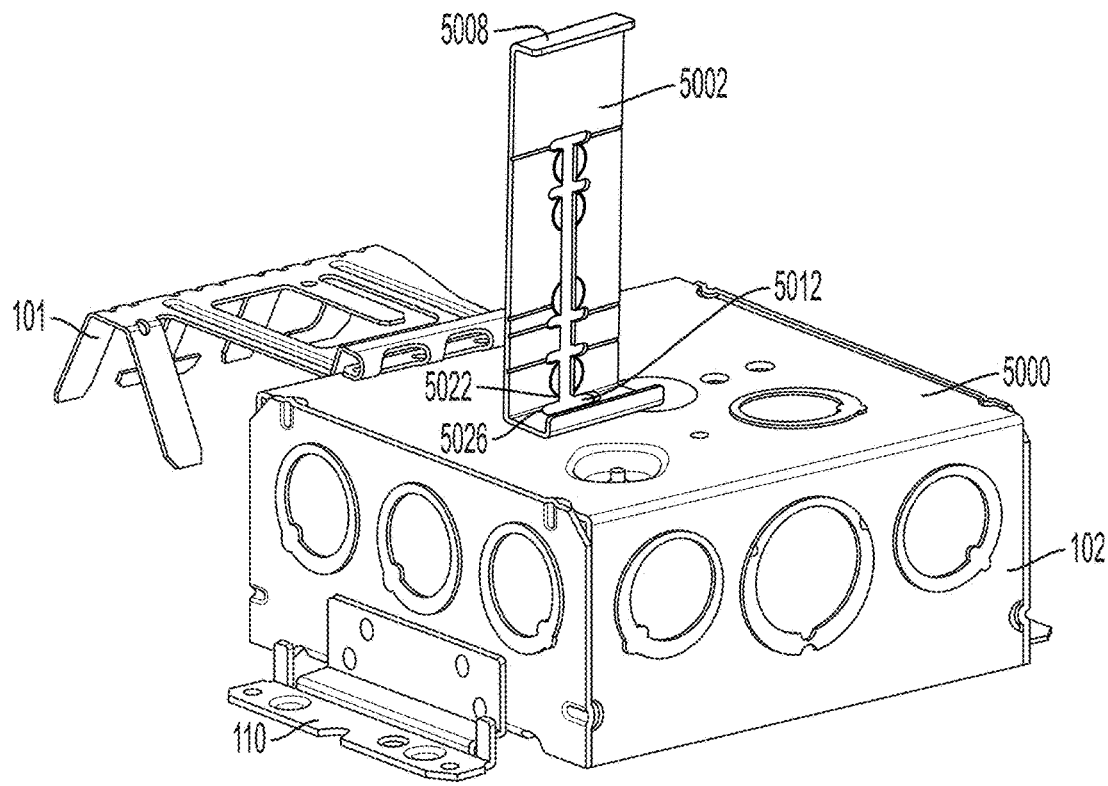
FIG. 61 is a bottom perspective view of the third embodiment of the electrical box assembly having the support member in a fifth installed position.
Figure 62:
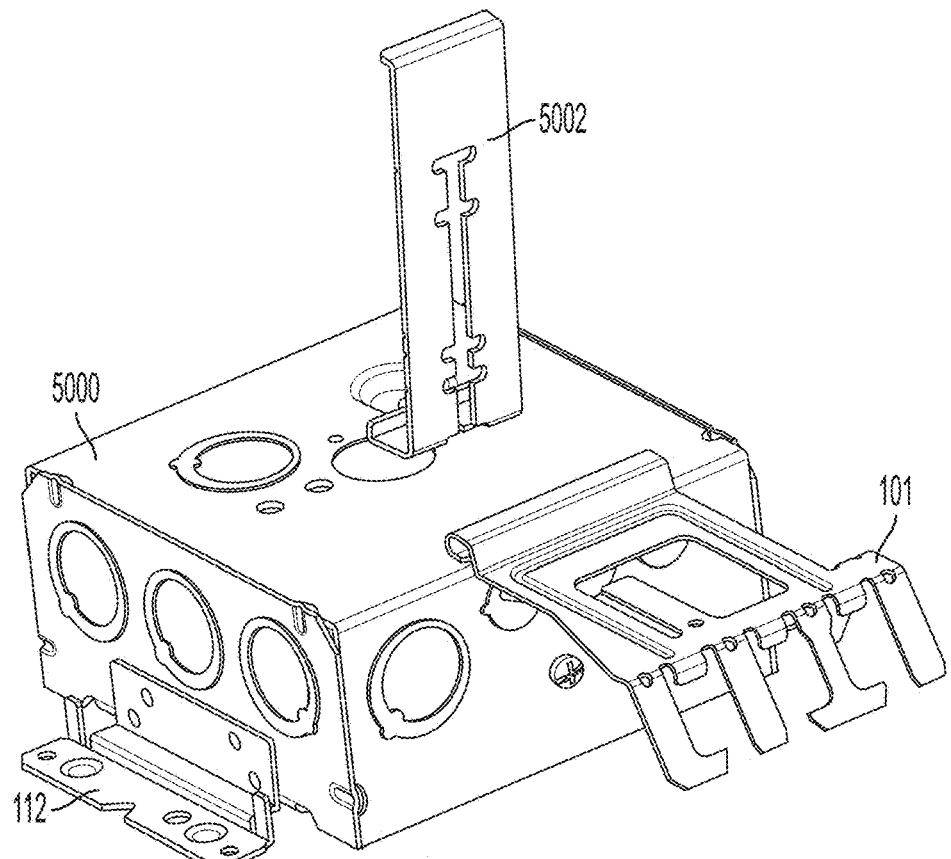
FIG. 62 is a top perspective view of FIG. 61.

Referring to FIGS. 60-61, electrical box assembly 5000, cable support bracket 101 and support member 5002 are show in a fifth installed position instead of the first installed position. The fifth installed position is the same as the first installed position of FIGS. 50-54 except support member 5002 is in a different position. To connect support member 5002 in the fifth installed position, fastener 5022 is moved to first indicia 5026 and inserted through elongated opening 5010 at first indicia 5026, and the side of support body 5004 that includes fold 5008 is bent at first slot 5012. For example, a user can move support member 5002 into the fifth installed position instead of the first installed position when the stud is wider than when using the first installed position such as a 6 inch stud. When installed on the 6 inch stud, fold 5008 will rest against the rear drywall panel in the fifth installed position when first bracket 110 and/or second bracket 112 are connected to the stud to support electrical box assembly 5000.

Electrical box assembly 5000, cable support bracket 101 and support member 5002 can be moved to a sixth installed position instead of the first installed position. The sixth installed position is the same as the first installed position of FIGS. 50-54 except support member 5002 is in a different position. To connect support member 5002 in the sixth installed position, fastener 5022 is moved to fifth indicia 5034 and inserted through elongated opening 5010 at fifth indicia 5034, and a side of support body 5004 that includes fold 5008 is bent at fifth slot 5020. For example, a user can move support member 5002 into the sixth installed position instead of the first installed position when the stud is narrower than when using the first installed position such as a 3.5 inch stud. When installed on the 3.5 inch stud, fold 5008 will rest against the rear drywall panel in the sixth installed position when first bracket 110 and/or second bracket 112 are connected to the stud to support electrical box assembly 5000.

Figure 64:
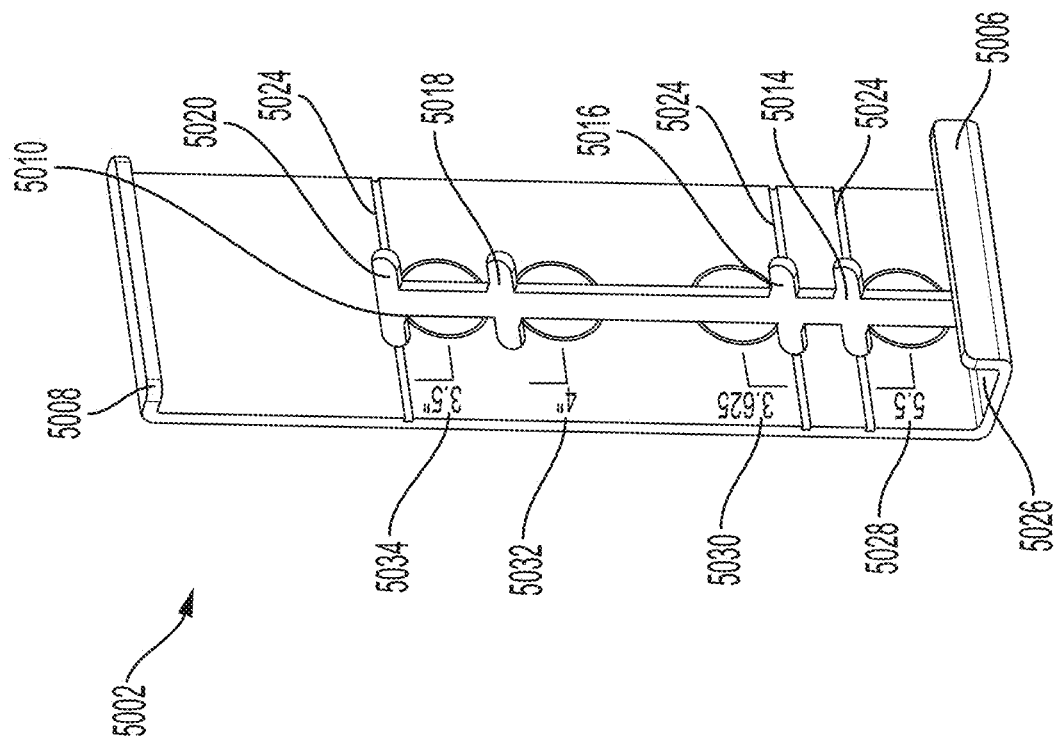
FIG. 64 is a bottom perspective view of FIG. 63.
Figure 63:
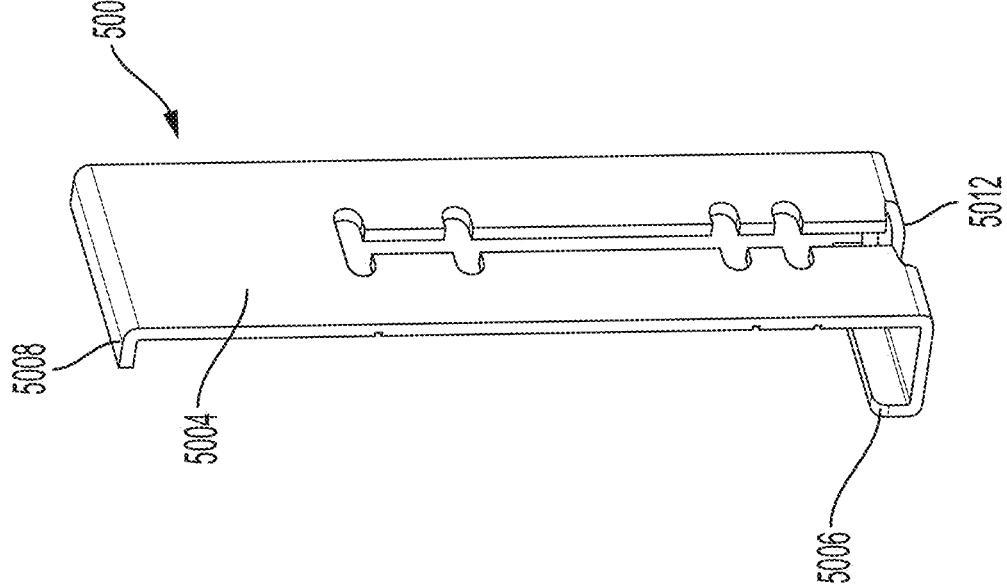
FIG. 63 is a top perspective view of the support member of the third embodiment of the electrical box assembly.

Referring to FIGS. 63-64, support member 5002 is shown bent along first slot 5012 for the fifth installed position. Support member 5002 has first indicia 5026 to indicate a location to place fastener 5022 in the fifth installed position as indicated by "6"". Support member 5002 has second indicia 5028 to indicate a location to place fastener 5022 in the fourth installed position as indicated by "5.5". Support member 5002 has third indicia 5030 to indicate a location to place fastener 5022 in the first installed position as indicated by "3.625". Support member 5002 has fourth indicia 5032 to indicate a location to place fastener 5022 in the third installed position as indicated by "4"". Support member 5002 has fifth indicia 5034 to indicate a location to place fastener 5022 in the sixth installed position as indicated by "3.5"". It is noted that there is no indicia for the second installed position because there is no need to move fastener 5022 or bend support member body 5004 from the shipped position.

Support member 5002 is a material that allows bending while still being a robust material. Support member 5002 is, for example, galvanized steel that is greater than 0.051 inch, and, can be 0.062 inch galvanized steel.

Accordingly, support member 5002 can be adjusted to different installed positions, namely, the first installed position of FIGS. 50-54, the second installed position of FIGS. 55-56, the third installed position of FIGS. 57-58, the fourth installed position of FIGS. 59-60, the fifth installed position of FIGS. 60-61 and the sixth installed position, so that support member 5002 accommodate various stud depths. Accordingly, support member 5002 eliminate extra box mounting brackets, by incorporating a universal stabilizer into electrical box assembly 5000. Support member 5002 is a plate that is designed to engage with a NEMA hole pattern in box body 102, and is supplied flat to the back of box body 102 to save shipping space.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

Support 10
Support body 12
First hook 14
Second hook 16
Protuberance 20
Rear appendages 22, 24
Holes 25
First side projection 26
Second side projection 28
U-shaped opening 30
Flap 32
Holes 34
Opening 36
Two openings 37, 38
Two openings 39, 40
Hole 41
Electrical box assembly 100
Cable support bracket 101
Box body 102
Five sides 104a-e
Opening 106
Holes 108a-c
First bracket 110
Second bracket 112
Connection portion 114
Support portion 116
Four areas 118
Connection section 119
Holes 120
Contact section 121
First bend 122
Second bend 124
Surface 126
Pry-outs 136a-c
Upper tab members 138, 140, 142, 144
Lower tab members 146, 148
Member support 149
Openings 150
Hooked members 152
Support extension 2100
Support extension body 2102
First opening 2104
Second opening 2106
Fold 2108
Ridges 2110, 2112
C-shaped member 2114, 2116
Tab 2118, 2020
Electrical box assembly 2700
Support base 2702
Support base extension 2704
Support base body 2706
Protuberances 2708, 2710, 2712
Opening 2714
Fastener 2715
First side projection 2716
Second side projection 2718
Hole 2719
Support extension body 2720
Support ridge 2722
Support ridge 2724
Tab member 2726
Tab member 2728
Elongated opening 2730
Holes 2732, 2734, 2736
First hook 2738
Second hook 2740
Protuberance 2742
Side 2744
Electrical box assembly 5000
Support member 5002
Support member body 5004
First fold 5006
Second fold 5008
Elongated opening 5010
First slot 5012
Second slot 5014
Third slot 5016
Fourth slot 5018
Fifth slot 5020
Fastener 5022
Line depressions 5024
First indicia 5026
Second indicia 5028
Third indicia 5030
Fourth indicia 5032
Fifth indicia 5034

What is claimed is:

1. An electrical box assembly comprising:
a box body having an opening into an interior volume and a rear wall opposite the opening, the rear wall having an inner surface inside the interior volume and an outer surface opposite the inner surface outside of the interior volume; and
a support connected to the box body, the support having a plurality of appendages, the plurality of appendages being adjustable to a plurality of configurations to adjust a size of the support, the support being connected to the outer surface of the rear wall of the box body to support the electrical box assembly by extending from the outer surface of the rear wall to rest on a panel.

2. The electrical box assembly of claim 1, wherein the support has a support body, and wherein the plurality of appendages extend outward from the support body.

3. The electrical box assembly of claim 2, wherein the support body has a U-shaped opening forming a flap that is bendable outward from the support body.

4. The electrical box assembly of claim 2, wherein the plurality of appendages are bendable to adjust their size.

5. The electrical box assembly of claim 1, wherein the support is movable from a shipping configuration where a support body of the support is adjacent the box body to an installed position where the support body moves away from the box body.

6. The electrical box assembly of claim 5, wherein the support body has a first side projection on a first side of a support body extending outward from the support body in a first direction, and wherein the support has a second side projection that extends from the support body that is bendable from a shipping configuration to an installed configuration so that the second side projection extends outward from the support body in a second direction that is opposite the first direction to maintain the support in the installed position.

7. The electrical box assembly of claim 5, wherein the support can be in the shipping position when connected to a stud.

8. The electrical box assembly of claim 1, further comprising a support extension that is connectable to the support, wherein the support extension is connectable to different positions along the support to adjust the size of the support.

9. The electrical box assembly of claim 8, wherein the support has a plurality of openings through a support body, and wherein the support extension connects to different openings of the plurality of openings to adjust the size of the support.

10. The electrical box assembly of claim 8, wherein the support extension has a tab that folds over the support to clamp onto the support.

11. The electrical box assembly of claim 8, wherein the support extension has a plurality of tabs, wherein each of the plurality of tabs folds over the support to clamp onto the support in a different position than another of the plurality of tabs.

12. The electrical box assembly of claim 1, wherein the support is 0.062 galvanized steel.

13. An electrical box assembly comprising:
a box body having an opening into an interior volume and a rear wall opposite the opening, the rear wall having an inner surface inside the interior volume and an outer surface opposite the inner surface outside of the interior volume; and
a cable support bracket connected to the box body, the cable support bracket being movable from a shipping position to an installed position, the cable support bracket being directly connected to the rear wall and adjacent the outer surface of the rear wall in the shipping position.

14. The electrical box assembly of claim 13, wherein the cable support bracket has a connection portion connected to the box body and a support portion that extends away from the connection portion.

15. The electrical box assembly of claim 14, wherein the support portion is adjacent the rear wall in the shipped position.

16. The electrical box assembly of claim 15, wherein the support portion is folded over the connection portion in the installed position.

17. The electrical box assembly of claim 14, wherein the support portion is extended away from the rear wall in the installed position.

18. An electrical box assembly comprising:
a box body having an opening into an interior volume and a rear wall opposite the opening, the rear wall having an inner surface inside the interior volume and an outer surface opposite the inner surface outside of the interior volume;
a support base that is connected to the outer surface of the rear wall of the box body; and
a support base extension that is connectable to the support base in a plurality of positions so that an assembly of the support base extension that is connected to the support base has a different size in each of the plurality of positions, the support base extension being connectable to the support base to support the electrical box assembly by extending from the outer surface of the rear wall to rest on a panel.

19. An electrical box assembly comprising:
a box body having an opening into an interior volume and a rear wall opposite the opening, the rear wall having an inner surface inside the interior volume and an outer surface opposite the inner surface outside of the interior volume; and
a support member selectively connected to the outer surface of the rear wall of the box body, the support member having at least one opening between two ends; and
a fastener that is selectively connectable to the support member through the at least one opening to connect the support member on the outer surface of the rear wall of the box body so that the support member is bendable on at least one side of the fastener to extend from the outer surface of the rear wall to rest on a panel.

* * * * *